United States Patent
Wang et al.

(10) Patent No.: US 12,430,311 B1
(45) Date of Patent: Sep. 30, 2025

(54) BUDGET-CONSTRAINED INDEX TUNING IN DATABASE SYSTEMS

(71) Applicant: Microsoft Technology Licensing, LLC, Redmond, WA (US)

(72) Inventors: Xiaoying Wang, Coquitlam (CA); Wentao Wu, Kirkland, WA (US); Chi Wang, Redmond, WA (US); Vivek Narasayya, Redmond, WA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/734,843

(22) Filed: Jun. 5, 2024

(51) Int. Cl.
   *G06F 16/22* (2019.01)
(52) U.S. Cl.
   CPC .................... *G06F 16/2282* (2019.01)
(58) Field of Classification Search
   CPC ............ G06F 16/24542; G06F 16/22; G06F 16/2471; G06F 16/2228; G06F 16/2282
   USPC .......................................................... 707/696
   See application file for complete search history.

(56) References Cited

U.S. PATENT DOCUMENTS

| | | | | |
|---|---|---|---|---|
| 9,594,783 | B2 * | 3/2017 | Aboulnaga | G06F 16/8365 |
| 2021/0357406 | A1 * | 11/2021 | Potharaju | G06F 16/2471 |
| 2021/0382897 | A1 * | 12/2021 | Potharaju | G06F 16/2471 |

OTHER PUBLICATIONS

Chaudhuri, et al., "Anytime algorithm of database tuning advisor for microsoft sql server.", Jun. 2020, pp. 1-10.
Akdere, et al., "Learning-based query performance modeling and prediction.", 28th International Conference on Data Engineering, IEEE, 2012, pp. 390-401.
Browne, et al., "A survey of monte carlo tree search methods.", IEEE Transactions on Computational Intelligence and AI in games, vol. 4, No. 1, Mar. 2012, pp. 1-49.
Brucato, et al., "Wred: Workload Reduction for Scalable Index Tuning," Proceedings of the ACM on Management of Data, vol. 2, Issue No. 1, 2024, 26 Pages.
Bruno, et al., "Automatic physical database tuning: A relaxation-based approach.", Proceedings of the 2005 ACM SIGMOD international conference on Management of data, 2005, 12 Pages.
Chaudhuri, et al., "An efficient, cost-driven index selection tool for Microsoft SQL server.", VLDB, vol. 97, 1997, pp. 1-10.

(Continued)

*Primary Examiner* — Hung T Vy
(74) *Attorney, Agent, or Firm* — Rainier Patents, P.S.

(57) ABSTRACT

This document relates to budget-constrained index tuning in database systems. A method for index tuning within a database system includes receiving a budget constraint, generating a set of candidate indexes for a workload of queries, and determining a derived cost for each query-configuration pair (QCP). The method further involves identifying a subset of QCPs where the derived cost and a what-if cost have a delta value below a predefined difference threshold and allocating the budget constraint to these identified QCPs to avoid what-if calls. Additionally, the method reallocates a saved portion of the budget constraint to other QCPs where the delta value exceeds the difference threshold, evaluates these other QCPs using what-if calls to select an optimal index configuration, and applies the selected index configuration to the database system.

20 Claims, 13 Drawing Sheets

(56) References Cited

OTHER PUBLICATIONS

Chaudhuri, et al., "AutoAdmin "what-if" index analysis utility.", ACM SIGMOD Record, vol. 27, No. 2, 1998, pp. 367-378.
Chaudhuri, et al., "Index selection for databases: A hardness study and a principled heuristic solution.", IEEE transactions on knowledge and data engineering, vol. 16, No. 11, 2004, pp. 1313-1323.
Choenni, et al., "On the selection of secondary indices in relational databases.", Data & knowledge engineering, vol. 11. No. 3, 1993, pp. 1-33.
Comer, et al., "The difficulty of optimum index selection.", ACM Transactions on Database Systems (TODS), vol. 3, No. 4, Dec. 1978, pp. 440-445.
Dash, et al., "Cophy: A scalable, portable, and interactive index advisor for large workloads.", arXiv preprint arXiv:1104.3214, 2011, pp. 362-372.
Ding, et al., "AI Meets AI: Leveraging Query Executions to Improve Index Recommendations," In Proceedings of the International Conference on Management of Data, Jun. 30, 2019, pp. 1241-1258.
Ganapathi, et al., "Predicting multiple metrics for queries: Better decisions enabled by machine learning.", 2009 IEEE 25th International Conference on Data Engineering. IEEE, 2009, 12 Pages.
Ghanayem, et al., "DTA Utility", Retrieved From: https://learn.microsoft.com/en-us/sql/tools/dta/dta-utility?view=sql-server-ver15, Mar. 4, 2023, 15 Pages.
Gupta, et al., "Index selection for OLAP.", Proceedings 13th International Conference on Data Engineering. IEEE, 1997, 12 Pages.
Hilprecht, et al., "Zero-Shot Cost Models for Out-of-the-box Learned Cost Prediction," In Repository of arXiv:2201.00561, Jan. 3, 2022, 14 Pages.
Kane, Andrew, "Introducing Dexter, the Automatic Indexer for Postgres", Medium, Retrieved From: https://medium.com/@ankane/introducing-dexter-the-automatic-indexer-for-postgres-5f8fa8b28f27, Jun. 27, 2017, 9 Pages.
Kocsis, et al., "Bandit based monte-carlo planning.", European conference on machine learning. Berlin, Heidelberg: Springer Berlin Heidelberg, 2006, 12 Pages.
Kossmann, et al., "Magic mirror in my hand, which is the best in the land? an experimental evaluation of index selection algorithms.", Proceedings of the VLDB Endowment, vol. 13, No. 12, 2020, pp. 2382-2395.
Kossmann, et al., "SWIRL: Selection of Workload-Aware Indexes Using Reinforcement Learning," EDBT, vol. 2, 2022, pp. 155-168 PPages.
Lan, et al., "An index advisor using deep reinforcement learning.", Proceedings of the 29th ACM International Conference on Information & Knowledge Management, 2020, 4 Pages.
Leis, et al., "How good are query optimizers, really?.", Proceedings of the VLDB Endowment, vol. 9, No. 3, 2015, pp. 204-215.
Li, et al., "Robust estimation of resource consumption for sql queries using statistical techniques.", arXiv preprint arXiv:1208.0278, Aug. 1, 2012, pp. 1555-1566.
Marcus, et al., "Neo: A learned query optimizer.", arXiv preprint arXiv:1904.03711, Apr. 7, 2019, pp. 1-18.
Marcus, et al., "Plan-structured deep neural network models for query performance prediction.", arXiv preprint arXiv:1902.00132, Jan. 31, 2019, 16 Pages.
Papadomanolakis, et al., "Efficient use of the query optimizer for automated physical design.", VLDB, Sep. 23-28, 2007, 12 Pages.
Paul, et al., "Database workload characterization with query plan encoders.", arXiv preprint arXiv:2105.12287, May 26, 2021, pp. 1-14.

Perera, et al., "DBA bandits: Self-driving index tuning under ad-hoc, analytical workloads with safety guarantees.", 2021 IEEE 37th International Conference on Data Engineering (ICDE), IEEE, Oct. 20, 2020, 12 Pages.
Perera, et al., "HMAB: self-driving hierarchy of bandits for integrated physical database design tuning.", Proceedings of the VLDB Endowment, vol. 16, No. 2, 2022, pp. 216-229.
Schlosser, et al., "Efficient scalable multi-attribute index selection using recursive strategies.", 35th International Conference on Data Engineering (ICDE). IEEE, 2019, 13 Pages.
Schnaitter, et al., "Index interactions in physical design tuning: modeling, analysis, and applications.", Proceedings of the VLDB Endowment, vol. 2, No. 1, Aug. 2009, 12 Pages.
Sharma, et al., "The case for automatic database administration using deep reinforcement learning.", arXiv preprint arXiv:1801.05643, Jan. 17, 2018, pp. 1-9.
Shi, et al., "Learned index benefits: Machine learning based index performance estimation.", Proceedings of the VLDB Endowment, vol. 15, No. 13, 2022, pp. 3950-3962.
Siddiqui, et al., "Cost models for big data query processing: Learning, retrofitting, and our findings.", Proceedings of the 2020 ACM SIGMOD International Conference on Management of Data, Feb. 27, 2020, 18 Pages.
Siddiqui, et al., "DISTILL: low-overhead data-driven techniques for filtering and costing indexes for scalable index tuning.", Proceedings of the VLDB Endowment, vol. 15, No. 10, 2022, 15 Pages.
Siddiqui, et al., "Isum: Efficiently compressing large and complex workloads for scalable index tuning.", Proceedings of the 2022 International Conference on Management of Data, Jun. 2022, 14 Pages.
Siddiqui, et al., "ML-Powered Index Tuning: An Overview of Recent Progress and Open Challenges.", ACM SIGMOD Record, vol. 52, vol. 4, Aug. 25, 2023, 12 Pages.
Sun, et al., "An end-to-end learning-based cost estimator.", arXiv preprint arXiv:1906.02560, Jun. 6, 2019, pp. 1-13.
Sutton, et al., "Reinforcement learning: An introduction.", MIT press, 2018, 10 Pages.
Valentin, et al., "DB2 advisor: An optimizer smart enough to recommend its own indexes.", Proceedings of 16th International Conference on Data Engineering, (Cat. No. 00CB37073). IEEE, 2000, 10 Pages.
Wang, et al., "Wii: Dynamic Budget Reallocation In Index Tuning," Proceedings of the ACM on Management of Data, vol. 2, No. 3, 2024, pp. 1-26.
Whang, Kyu-Young, "Index Selection in Relational Databases," In Proceedings of the International Conference on Foundations of Data Organization, May 21-24, 1985, pp. 369-378, 10 pages.
Wu, et al., "Budget-aware index tuning with reinforcement learning.", Proceedings of the 2022 International Conference on Management of Data, 2022, pp. 1-20.
Wu, et al., "Predicting query execution time: Are optimizer cost models really unusable?.", 29th International Conference on Data Engineering (ICDE). IEEE, 2013, 18 Pages.
Wu, et al., "Sampling-based query re-optimization.", Proceedings of the 2016 International Conference on Management of Data, Jan. 21, 2016, pp. 1-19.
Wu, et al., "Towards predicting query execution time for concurrent and dynamic database workloads.", Proceedings of the VLDB Endowment, vol. 6, No. 10, 2013, 12 Pages.
Wu, et al., "Uncertainty aware query execution time prediction.", arXiv preprint arXiv:1408.6589, Aug. 27, 2014, pp. 1-26.
Zhao, et al., "QueryFormer: A Tree Transformer Model for Query Plan Representation," Proceedings of the VLDB Endowment, vol. 15, Issue No. 8, 2022, pp. 1658-1670.

* cited by examiner

BUDGET-CONSTRAINED INDEX TUNING IN DATABASE SYSTEMS

BACKGROUND

Index tuning is a process in database management systems, designed to optimize query performance by selecting the best set of indexes for a given workload. Indexes help speed up query execution by allowing quick data retrieval, but identifying the optimal index configuration is often resource-intensive and time-consuming.

Traditional index tuning methods involve extensive "what-if" analysis, where numerous hypothetical index configurations are evaluated by the query optimizer to estimate their impact on query performance. This process can be computationally expensive due to the large number of possible configurations, leading to significant consumption of system resources.

To manage this complexity, budget constraints are often applied to limit the number of what-if calls made during index tuning. However, effectively allocating this limited budget remains a challenge. Existing solutions frequently allocate resources suboptimally, leading to wasted computational effort on what-if calls that could be approximated using more efficient techniques.

SUMMARY

This patent relates to index tuning in database systems. In a database system, an example method begins by setting a budget constraint for index tuning. A set of candidate indexes is then generated to handle the workload of queries. For each query-configuration pair (QCP), a derived cost is calculated using a cost derivation technique. The method can also include identifying QCPs where the difference between the derived cost and the what-if cost is minimal, staying below a predefined threshold.

A portion of the budget is allocated to these identified QCPs, thus avoiding unnecessary what-if calls. The savings from this allocation are then redirected to other QCPs where the cost difference exceeds the threshold. These reallocated QCPs are evaluated through what-if calls to determine the optimal index configuration. Finally, this selected index configuration is applied to the database system, enhancing overall performance, and minimizing operational cost.

This Summary is intended to introduce some of the present concepts described in this patent and is not intended to be limiting or all-inclusive of the novel concepts.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
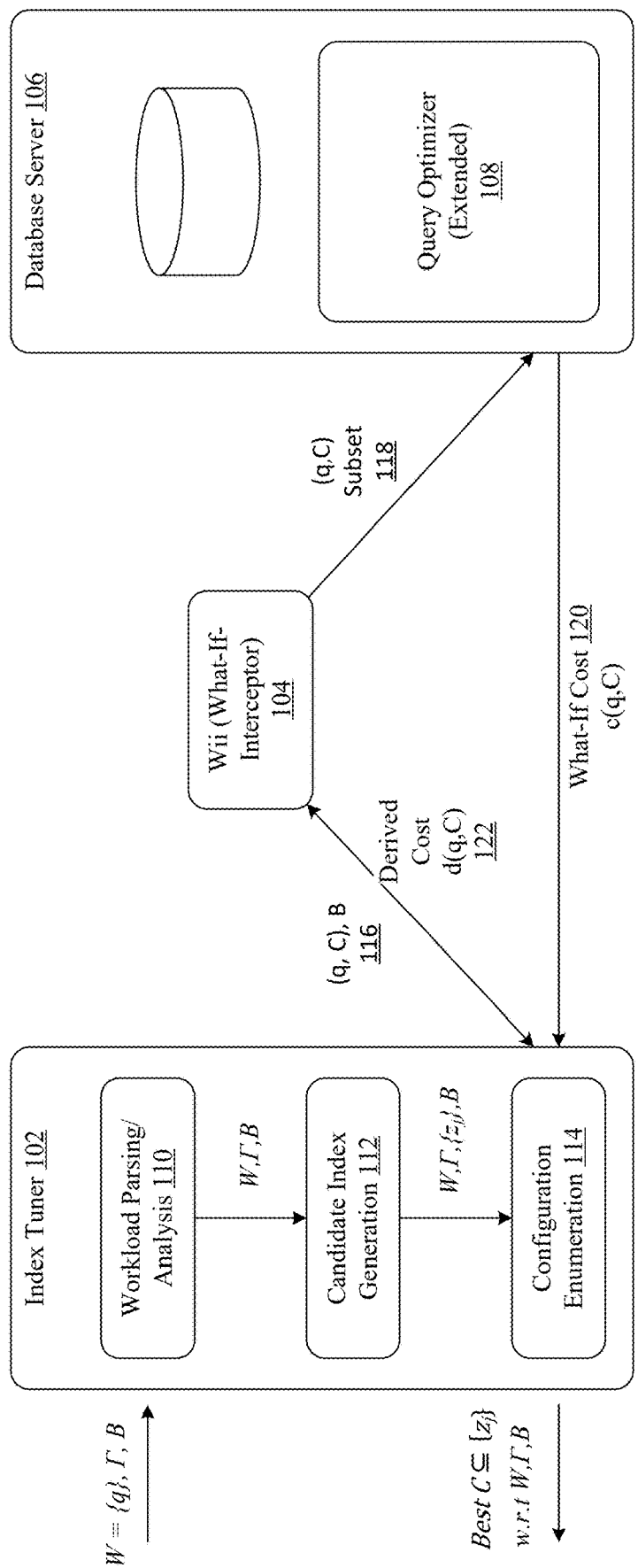
FIG. 1 is an example architecture of a system that can be used to practice aspects of the present technology.

This patent relates to index tuning within database systems, specifically addressing the optimization of query performance through efficient budget allocation. Indexes are used to speed up query execution by enabling quick data retrieval. However, the process of finding an optimal index configuration can be time-consuming and resource-intensive due to the extensive "what-if" analyses required.

Traditional index-tuning methods involve numerous hypothetical index configurations being evaluated by a query optimizer, which estimates each index configuration's impact on query performance. This process can be computationally expensive, particularly given the large number of possible configurations. To manage compute expenses, budget constraints are often applied, limiting the number of what-if calls that can be made. However, current solutions often allocate budget inefficiently, leading to wasted resources on unnecessary what-if calls.

Index tuners, such as the Database Tuning Advisor (DTA) developed for Microsoft SQL Server™, have been offering a timeout option that allows users to explicitly control the execution time of index tuning to prevent index tuners from running indefinitely. Budget-aware index tuning can be used to put a budget constraint on the number of "what-if" calls. The use of the budget constraint is motivated by the fact that most of the time and resources in index tuning is spent on what-if calls made to the query optimizer during configuration enumeration by the index tuner. Index tuners are described relative to Microsoft SQL Server™. However, it will be understood that the present concepts can be applied to any database architecture.

A what-if call takes as input a query-configuration pair (QCP) and returns an estimated cost of the query by utilizing the indexes in the configuration. This process is the same as a regular query optimizer call except that the call also takes hypothetical indexes, i.e., indexes that are proposed by the index tuner but have not been materialized, into consideration. There can be thousands or even millions of potential what-if calls when tuning large and complex workloads. Therefore, it is not feasible to make a what-if call for every QCP encountered in configuration enumeration. As a result, one key technical problem in budget-aware index tuning is budget allocation. In budget allocation the query optimizer determines which QCPs to make what-if calls for so that the index tuner can find an optimal index configuration.

Unfortunately, optimal budget allocation is NP-hard (Non-deterministic Polynomial-time hard). Existing budget-aware configuration search algorithms range from adaptations of the classic greedy search algorithm to Monte Carlo Tree Search (MCTS), which allocates budget by leveraging various heuristics. For example, the greedy search variants adopt a simple "first come first serve" (FCFS) strategy where what-if calls are allocated on demand. The MCTS-based approach considers the rewards observed in previous budget allocation steps to decide the next allocation step. These budget allocation strategies can be inferior. To be sure, many what-if calls are unnecessary, as their corresponding what-if costs are close to the approximations given by a well-known technique called cost derivation. Compared to making a what-if call, cost derivation is computationally much more efficient, and has been integrated into commercial index tuning software such as DTA.

The present concepts provide a technical solution for dynamic budget reallocation in index tuning. By calculating a derived cost for each query-configuration pair (QCP) and identifying pairs where the difference between the derived cost and the what-if cost is minimal, the system can allocate the budget more effectively. This process avoids unnecessary what-if calls, reallocating the saved budget to more critical QCPs where the cost difference is significant. Reallocated QCPs are evaluated through what-if calls to select the optimal index configuration, which is subsequently applied to the database system and ensures that resources are used efficiently. This technical solution enhances the performance of the database system.

Example Implementations

Introductory FIG. 1 shows an example computing architecture or system 100. The system 100 includes an index tuner 102, a Wii 104 (What If Interceptor), and a database server 106 having a query optimizer 108. While this general depiction is provided as an example, one of ordinary skill in the art will appreciate that other configurations can be used.

In general, index tuning is used to find an optimal index configuration (i.e., a set of indexes) for an input workload of SQL queries. Index tuning is often a time-consuming and resource-intensive process for large and complex workloads. It is therefore desirable to constrain the index tuner 102 by limiting the execution of the query optimizer 108 with respect to time and resources. This compromise shifts the goal of index tuning to seeking the best configuration within the given time and resource constraints.

The index tuner 102 generally includes functions such as workload parsing and analysis 110, candidate index generation 112, and configuration enumeration 114. Workload parsing and analysis 110 involves analyzing the workload to understand the characteristics of the queries being executed on the database.

This process starts by parsing the SQL queries to extract relevant features such as the tables involved, the columns accessed, and the operations performed (e.g., joins, filters, aggregations). Analysis helps in identifying query patterns and frequently accessed data, which are used to make informed decisions during index tuning. By understanding the workload, the workload parsing and analysis 110 function can assess the current performance bottlenecks and determine the areas where indexing could provide the most benefit.

Candidate index generation 112 can create a set of potential indexes that could be used to optimize the workload. Based on the insights gained from the workload parsing and analysis 110, the candidate index generation 112 function generates candidate indexes by considering various indexing strategies.

These indexing strategies include creating single-column indexes, composite indexes, and covering indexes tailored to the specific needs of the queries. The candidate indexes are designed to improve query performance by reducing the amount of data scanned and speeding up data retrieval. The goal of this function is to provide a comprehensive list of index options that can be evaluated during the configuration enumeration process.

Configuration enumeration 114 involves evaluating different combinations of the candidate indexes to determine the optimal index configuration. Configuration enumeration 114 systematically explores the search space of possible index configurations. Configuration enumeration 114 uses techniques such as cost estimation and what-if analysis to predict the impact of each configuration on query performance. By simulating the execution of queries with different index configurations, the configuration enumeration 114 identifies the set of indexes that offer the best performance improvements within the given budget constraints. This process involves evaluating various query-configuration pairs (QCPs), which are combinations of specific queries and candidate index configurations. As illustrated in FIG. 1, a QCP is designated as (q,C). Each QCP is analyzed to estimate its impact on performance, allowing the configuration enumeration function to prioritize which combinations to test based on their potential benefit. The configuration enumeration ensures that the optimal index setup not only enhances performance but also adheres to constraints such as storage limits and query execution time.

In some instances, the index tuner 102 can provide the Wii 104 with a budgeted query configuration pair 116 (q,C), B. Once filtered by the Wii 104, a subset of the query configuration pairs 118 requiring what-if determinations are provided to the query optimizer 108. The query optimizer 108 can return a cost 120 for the what-if calls for the subset to the index tuner 102.

To effectively manage budget constraints in index tuning, the system 100 utilizes the concept of a derived cost 122 (shown on FIG. 1 as d(q,C)). As used herein, derived cost refers to an approximation of the actual cost, obtained through cost derivation techniques. These techniques estimate the computational expense of executing a query with a given index configuration without performing the full what-if analysis. By providing a reliable estimate, derived costs enable the system to make informed decisions about which query-configuration pairs to prioritize for detailed evaluation. This optimizes the use of limited computational resources and maintains high performance while adhering to budget constraints.

Figure 2:
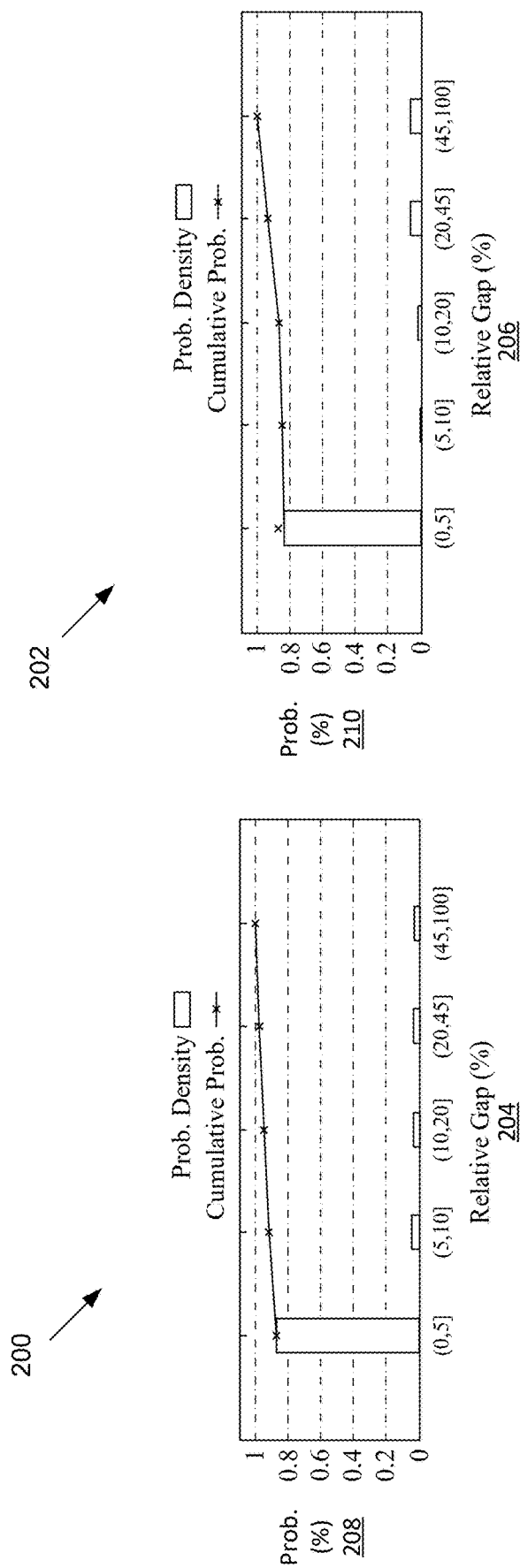
FIG. 2 illustrates graphs that reflect a probability density related to gaps between derived costs and actual costs of what-if calls.

FIG. 2 illustrates in graphical format a distribution of the relative gap or difference between what-if cost and derived cost when tuning a benchmark workload with 99 complex queries. The following descriptions will refer to FIGS. 1 and 2 collectively. This difference may be referred to as a delta value.

In both graphs 200 and 202, 80% to 90% of the what-if calls were made for QCPs with a relative gap below 5%, for two state-of-the-art budget-aware configuration search algorithms. The two budget-aware configuration search algorithms are two-phase greedy (graph 200) and MCTS (graph 202), described in greater detail infra. If the derived cost is a good approximation, the index tuner 102 can avoid spurious what-if calls. For instance, the gap or distance between the derived cost and the what-if cost can be represented as a percentage and compared against a predefined percentage threshold. The percentage threshold values are located on the vertical axes 208 and 210 of the graphs 200 and 202, respectively.

If the relative gap is below a threshold of 5%, for example, the system 100 can confidently skip the what-if call, using the derived cost as a sufficient estimate. This predefined threshold helps in determining when the approximation is close enough to the actual cost, optimizing the index tuning process by reducing unnecessary computations. In these graphs, each horizontal axis 204 and 206 pertains to a relative gap in terms of percentage value. Other threshold values besides 5%, such as higher and lower values are contemplated.

Under a mild assumption on the monotonicity of the query optimizer's 108 cost function (i.e., a larger configuration with more indexes should not increase the query execution cost), the derived cost acts as an upper bound of the what-if cost. However, the what-if cost can lie anywhere between zero and the derived cost.

Therefore, the index tuner 102 can be configured to determine a lower bound for the what-if cost. The gap between the lower bound and the upper bound (i.e., the derived cost) therefore measures the closeness between the what-if cost and the derived cost. In some instances, a what-if call can be avoided when the gap is small and the derived cost can be used as a surrogate.

In some instances, the lower bound is nontrivial, i.e., the lower bound needs to be as close to the what-if cost as possible. An example of a trivial lower bound would be zero. Also, the lower bound is computationally efficient compared to making a what-if call. Relatedly, the lower bound can be integrated with existing budget-aware configuration enumeration algorithms.

In sum, calculating the upper and lower bounds helps streamline the process of optimizing a database by providing estimates that guide decision-making. The lower bound is the maximum expected benefit of a potential database configuration. The upper bound is the minimum potential benefit of a configuration.

By using these bounds, the Wii 104 can skip testing configurations that fall between these estimates, focusing efforts on those where the gap between the lower/upper bounds is large. This approach makes the optimization process faster and more efficient because the Wii 104 can reduce the number of configurations that the system needs to evaluate in detail.

In some instances, the index tuner 102 calculates a lower bound that depends on common cost function properties used by the index tuner 102, such as monotonicity and submodularity. These cost function properties are used for accurate estimation and optimization. In one implementation, the index tuner 102 can determine a marginal cost improvement (MCI) that each index in the given configuration can achieve. The index tuner 102 establishes an upper bound on the cost improvement (and therefore a lower bound on the what-if cost) of the given configuration by summing up the upper bounds on the MCIs of individual indexes. The system also determines the fraction of single-ton-configuration what-if costs during the index tuning process and enables coverage-based refinement when this fraction exceeds a predefined threshold.

Certain optimization techniques can be used by the query optimizer 108 to refine the lower bound for budget-aware greedy search algorithms and MCTS-based algorithms, as will be discussed herein. In some instances, the computation time of the lower bound is orders of magnitude less compared to a what-if call. However, the calculation of the lower bound is in general more expensive than computing the upper bound, i.e., the derived cost. For example, when running the MCTS configuration enumeration algorithm on top of the TPC-DS (Transaction Processing Performance Council-Decision Support) benchmark, on average it takes 0.02 milliseconds and 0.04 milliseconds for the index tuner 102 to compute a derived cost and a lower bound, respectively. In contrast, the average time of making a what-if call to the query optimizer 108 is around 800 milliseconds.

The lower bound can be integrated with existing budget-aware index-tuning algorithms. From a software engineering perspective, the integration is non-intrusive, meaning that there is no need to change the architecture of the current cost-based index-tuning software stack.

As illustrated in FIG. 1, the lower-bound computation can be performed in the Wii 104. During configuration enumeration 114, the Wii 104 intercepts what-if calls made to the query optimizer 108. The Wii 104 then computes the lower bound of the what-if cost and checks the closeness between the lower bound and the derived cost with a confidence-based analysis. If the closeness is within a predetermined difference threshold, the Wii 104 skips the what-if call and instead sends the derived cost back to the configuration enumerator 114.

For example, if the actual what-if cost for a query-configuration pair (QCP) is calculated to be 100 units, and the derived cost approximation is 95 units, the difference between the two values is five units. This derived cost can be used in determining whether a full what-if call to the query optimizer 108 is necessary (e.g., should be made) or can be skipped based on the closeness to the actual cost.

To illustrate, during configuration enumeration 114, the Wii 104 intercepts what-if calls made to the query optimizer 108 and computes the lower bound of the what-if cost. Suppose the lower bound is calculated to be 90 units. The Wii 104 then checks the closeness between the lower bound (90 units) and the derived cost (95 units) using a confidence-based analysis. If the difference of five units falls within a predetermined threshold, such as ten units, the Wii 104 skips the what-if call and sends the derived cost back to configuration enumeration 114. This process ensures efficient budget allocation by avoiding unnecessary what-if calls when the derived cost is sufficiently close to the actual cost.

The effectiveness of the analysis performed by the Wii 104 can be measured by: (1) the number of what-if calls the Wii 104 skips; and (2) the overall improvement in the final index configuration that is achieved. By reallocating the saved budget to what-if calls where the difference between the derived cost and the actual cost is larger, the Wii 104 can substantially enhance performance on both standard industrial benchmarks and real customer workloads.

Finally, the Wii 104 can also be used in situations where a budget is not enforced on the index tuner 102, namely when the index tuner 102 has an infinite budget on the number of what-if calls. This situation may arise, for example, when there is a relatively small workload.

Since there is no budget constraint, the Wii 104 cannot improve the quality of the final configuration found, as the best quality can anyways be achieved by continuing to issue what-if calls to the query optimizer 108. Instead, by skipping spurious what-if calls, the Wii 104 can significantly improve the overall efficiency of index tuning. For example, without a budget constraint, when tuning a standard TPC-H (Transaction Processing Performance Council-H) benchmark with 22 queries, the Wii 104 can reduce index tuning time by 3X while achieving the same quality on the best configuration found.

As FIG. 1 shows, cost-based index tuning includes candidate index generation 112. A set of candidate indexes can be generated for each query in the workload based on the indexable columns. Indexable columns are those that appear in the selection, join, group-by, and order-by expressions of a SQL query, which are used as key columns for fast seek-based index lookups. The union of the candidate indexes is obtained from individual queries as the candidate indexes for the entire workload. A subset (i.e., a configuration) of the candidate indexes is determined that can minimize the what-if cost of the workload, with respect to constraints such as the maximum number of indexes allowed, or the total amount of storage taken by the index configuration.

Index tuning is time-consuming and resource-intensive, due to the large number of what-if calls issued to the query optimizer 108 during configuration enumeration 114. Given an input workload W with a set of candidate indexes I, a set of constraints Γ, and a budget B on the number of what-if calls allowed during configuration enumeration 114, the index tuner 102 can find a configuration $C^* \subseteq I$ whose what-if cost c(W, C*) is minimized under the constraints given by Γ and B.

Although the constraints in I can be arbitrary, the cardinality constraint K specifies the maximum configuration size (i.e., the number of indexes contained by the configuration) allowed. Moreover, under a limited budget B, it is often impossible to know the what-if cost of every query-configuration pair (QCP) encountered during configuration enumeration 114. Therefore, to estimate the costs for QCP's where what-if calls are not allocated, the Wii 104 relies on an approximation of the what-if cost without invoking the query optimizer 108.

As noted above, one approximation technique is cost derivation. Given a QCP(q,C), its derived cost d(q,C) is the minimum cost over all subset configurations of C with known what-if costs. Formally, the derived cost of q over C is:

$$d(q, C) = \min_{S \subseteq C} c(q, S). \quad \text{Equation (1)}$$

The formula c(q,S) represents the estimated cost of running a query q using only a subset S of all possible indexes from a configuration C. This operates under the "monotonicity property" of index configuration costs. This property states that if there are two sets of indexes, C1 and C2, where C1 is a subset of C2 (meaning C2 includes all indexes in C1 plus potentially more), the cost of running the query with the larger set C2 will not be higher than the cost of running the query with the smaller set C1. In other words, adding more indexes should not increase the cost of running the query. This assumption is important because it allows for more accurate predictions about the costs of different index configurations without needing to test every possible combination, thus saving time and resources.

Validation results using Microsoft SQL Server™ show that monotonicity holds with probability between 0.95 and 0.99, on a variety of benchmark and real workloads.

Under Assumption 1:

$$d(q,C) \geq c(q,C)$$

i.e., derived cost is an upper bound U(q,C) of what-if cost:

$$U(q, C) = d(q, C) = \min_{S \subseteq C} c(q, S).$$

The budget-aware configuration search problem is NP-hard. At the core of this problem is budget allocation, namely, to decide on which QCP's to make what-if calls. Existing heuristic solutions to the problem include: (1) vanilla greedy, (2) two-phase greedy, (3) AutoAdmin greedy, and (4) MCTS—just to name a few.

Figure 3B:
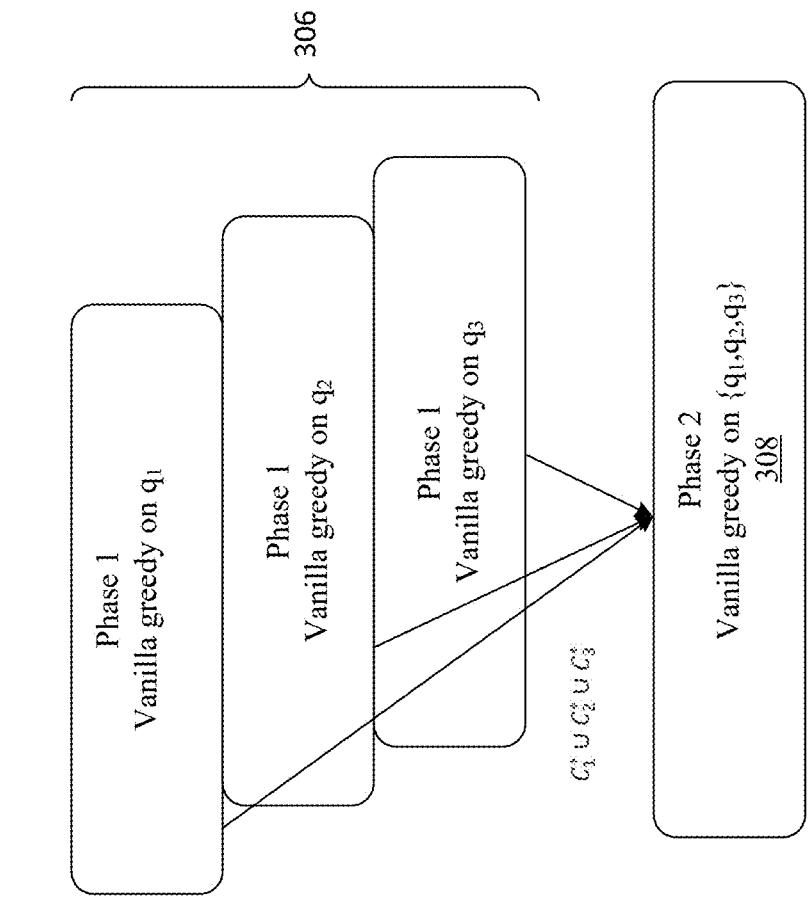
FIG. 3B illustrates the two-phase greedy algorithm that can be viewed as an optimization on top of vanilla greedy.
Figure 3A:
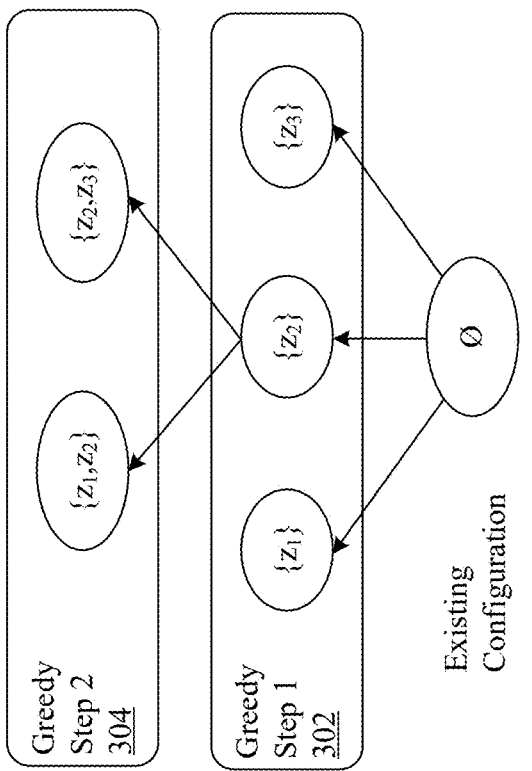
FIG. 3A illustrates a vanilla greedy algorithm with an example of three candidate indexes and a cardinality constraint.

FIG. 3A illustrates a vanilla greedy algorithm with an example of three candidate indexes $\{z_1, z_2, z_3\}$ and the cardinality constraint K=2. It will be understood that Ø represents the existing configuration. Vanilla greedy works step-by-step, where each step adopts a greedy policy to choose the next index to be included that can minimize the workload cost on the chosen configuration. This example includes two greedy steps. The first step 302 examines the three singleton configurations $\{z_1\}$, $\{z_2\}$, and $\{z_3\}$. Suppose that $\{z_2\}$ results in the lowest workload cost. The second step 304 tries to expand $\{z_2\}$ by adding one more index, which leads to two candidate configurations $\{z_1, z_2\}$ and $\{z_2, z_3\}$. Suppose that $\{z_1, z_2\}$ is better and therefore returned by vanilla greedy. Note that the configuration $\{z_1, z_3\}$ is never visited in this example. Vanilla greedy adopts a simple "first come first serve (FCFS)" budget allocation policy to make what-if calls.

FIG. 3B illustrates the two-phase greedy algorithm that can be viewed as an optimization on top of vanilla greedy. Specifically, there are two phases of greedy search in two-phase greedy. In Phase 1 at 306, each query can be viewed as a workload by itself and vanilla greedy can be run on top to obtain the best configuration for that query. In this particular example, there are three queries $q_1$, $q_2$, and $q_3$ in the workload. After running vanilla greedy, likely best configurations $C_1^*$, $C_2^*$, and $C_3^*$ can be obtained, respectively. In Phase 2 at 308, the union of the best configurations found for individual queries can be used as the refined set of candidate indexes for the entire workload.

Vanilla greedy can be run again for the workload with a refined set of candidate indexes, as depicted in FIG. 3B for the given example. Two-phase greedy has particular importance in practice as two-phase greedy has been adopted by commercial index tuning software such as Microsoft's Database Tuning Advisor (DTA)™. Again, budget is allocated with the simple FCFS policy—the same as in vanilla greedy.

Figure 4:
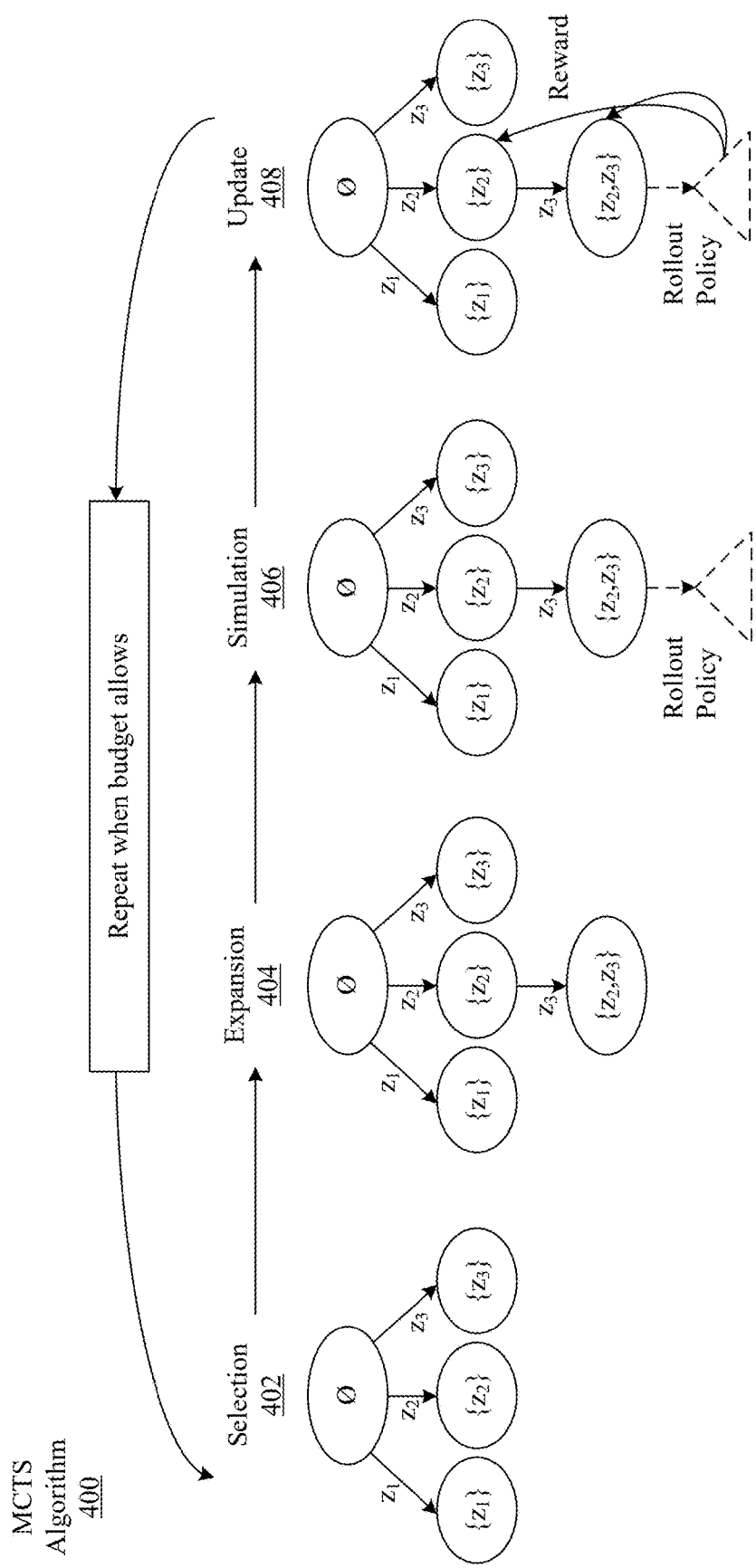
FIG. 4 illustrates the MCTS algorithm with the same example used in FIGS. 3A and 3B.

FIG. 4 illustrates MCTS algorithm 400 with the same example used in FIGS. 3A and 3B. The MCTS algorithm 400 is an iterative procedure that allocates one what-if call in each iteration until the budget runs out. The decision procedure in each iteration on which query and which configuration to issue the what-if call is an application of the classic Monte Carlo tree search (MCTS) algorithm in the context of index configuration search. The MCTS algorithm 400 involves four steps: selection 402, expansion 404, simulation 406, and update 408. After all what-if calls are issued, vanilla greedy is run again without making extra what-if calls to find one or more optimal or high-performing configurations. One version of MCTS employs an e-greedy policy when selecting the next index to explore. To bootstrap this e-greedy policy, a special warm-up stage is conducted before running MCTS. The purpose of the warm-up stage is to assign a prior to the reward distribution of singleton configurations. This stage consumes half of the budget on what-if calls and targets singleton configurations. Assigning a prior involves establishing an initial assumption or estimate about the reward distribution for singleton configurations. This provides a "prior distribution" to the rewards of singleton configurations, helping to guide the decision-making process in the MCTS algorithm by offering a starting point for evaluating the potential benefits of different configurations based on the limited initial data available.

The Wii 104 is configured to skip spurious what-if calls where what-if costs and derived costs are close. In one implementation, the Wii 104 can develop a lower bound for the what-if cost. If the gap between the lower bound and the derived cost is small, then the Wii 104 is configured to skip the what-if call.

In some implementations, a generic form of the lower bound calculation is contemplated. Additionally, a confidence-based framework is employed by the Wii 104 on top of the lower bound to skip spurious what-if calls.

In database systems, optimizing index configurations to improve query performance can involve evaluating various query-configuration pairs (QCPs). Efficiently managing the resources allocated for these evaluations is preferred, particularly when operating under budget constraints. One effective approach to this technical problem involves the use of bounding techniques to decide when certain evaluations can be safely skipped without compromising the accuracy of the results.

In one implementation, a query q and index configuration C are determined. A what-if cost c(q,C) for the query-configuration pair (q,C) can then be determined. A lower bound L(q,C) and an upper bound U(q,C) for c(q,C) are calculated, namely, $L(q,C) \le c(q,C) \le U(q,C)$. Given a threshold e, if $U(q,C)-L(q,C) \le \epsilon$, then the what-if call to the pair (q,C) can be skipped, and the Wii 104 returns U(q,C) instead. L(q,C) denotes the lower bound of the what-if cost c(q,C). A marginal cost improvement (MCI) of an index provides the additional benefit of adding an index to a configuration for a query. L(q,C) is then established by leveraging the upper bounds of MCI.

It will be understood that a marginal cost improvement (MCI) of an index z with respect to a query q and a configuration X can be represented as:

$$\delta(q,z,X) = c(q,X) - c(q,X \cup \{z\}).$$   Equation (2)

It will also be understood that a cost improvement as used herein is defined as a cost improvement (CI) of a query q given a configuration X can be represented as:

$$\Delta(q,X) = c(q,\emptyset) - c(q,X)$$   Equation (3)

CI can be expressed in terms of MCI. Specifically, consider a query q and a configuration $C=\{z_1, \ldots, z_m\}$. The cost improvement $\Delta(q,C)$ can be seen as the sum of MCIs by adding the indexes from C one by one, namely, $$\Delta(q,C) = (c(q,\emptyset) - c(q,\{z_1\})) + (c(q,\{z_1\}) - c(q, \{z_1,z_2\})) + \ldots + (c(q,\{z_1,\ldots,z_{m-1}\}) - c(q,C)).$$

Let $C_0 = \emptyset$ and $C_j = C_{j-1} \cup \{z_j\}$ for $1 \le j \le m$. It follows that $C_m = C$ and therefore, $$\Delta(q, C) = \sum_{j=1}^{m} \delta(q, z_j, C_{j-1}).$$

A configuration-independent upper bound $u(q,z_j)$ can be determined for $\delta(q,z_j,C_{j-1})$, namely, $u(q,z_j) \ge \delta(q,z_j,X)$ for any X, then $$\Delta(q, C) \le \sum_{j=1}^{m} u(q, z_j).$$

As a result, $$c(q, \emptyset) - c(q, C) \le \sum_{j=1}^{m} u(q, z_j),$$

and it follows that $$c(q, C) \ge c(q, \emptyset) - \sum_{j=1}^{m} u(q, z_j).$$

Therefore the lower bound can be set as:

$$L(q, C) \text{ as } L(q, C) = c(q, \emptyset) - \sum_{j=1}^{m} u(q, z_j) \qquad \text{Equation (4)}$$

This idea can be further generalized if the what-if costs of configurations that are subsets of C can be determined by the Wii 104. Specifically, let $S \subset C$ be a subset of C with known what-if cost c(q,S). Without loss of generality, let $C-S = \{z_1, \ldots, z_k\}$. Thus, $$c(q, S) - c(q, C) = \sum_{i=1}^{k}(c(q, C_{i-1}) - c(q, C_i)) \le \sum_{i=1}^{k} u(q, z_i),$$

where $C_0$ is now set to S. Therefore, $$c(q, C) \ge c(q, S) - \sum_{i=1}^{k} u(q, z_i).$$

Since S is arbitrary, it can be concluded that $$c(q, C) \ge \max_{S \subset C}\left(c(q, S) - \sum_{z \in C-S} u(q, z)\right).$$

As a result, the Wii 104 sets:

$$L(q, C) = \max_{S \subset C}\left(c(q, S) - \sum_{z \in C-S} u(q, z)\right). \qquad \text{Equation (5)}$$

Since $\emptyset \subset C$, Equation 5 is a generalization of Equation 4.

The Wii 104 is configured to maintain an upper bound $u(q,z)$ for the MCI of each query q and each individual index z so that $u(q,z) \geq \delta(q,z,X)$ for any configuration X.

In some instances, the Wii 104 can leverage the CIs of explored configurations that contain z, along with properties, such as monotonicity and submodularity, of the cost function used by the query optimizer.

With respect to calculating a naive upper bound, let $\Omega$ be the set of all candidate indexes. Under Assumption 1, $$u(q,z)=c(q,\emptyset)-c(q,\Omega)=\Delta(q,\Omega)$$

Equation (6) is a valid upper bound of $\delta(q,z,X)$ for any X.

Intuitively, by the monotonicity property, the MCI of any single index z cannot be larger than the CI of all candidate indexes in Q combined. In practical index tuning applications, $c(q,\Omega)$ is often available. However, if $c(q,\Omega)$ is unavailable, then $u(q,z)=c(q,\emptyset)$ as it always holds that $c(q,\Omega) \geq 0$.

With respect to the upper bound by submodularity, the naive upper bound can be improved by assuming that the cost function is submodular. Given two configurations $X \subseteq Y$ and an index $z \notin Y$, if follows that $$c(q,Y)-c(q,Y\cup\{z\}) \leq c(q,X)-c(q,X\cup\{z\}).$$

Equation (7) or equivalently, $\delta(q,z,Y) \leq \delta(q,z,X)$.

That is, the MCI of an index z diminishes when z is included into a larger configuration with more indexes. Submodularity does not hold often due to index interaction. The submodularity assumption has been validated using Microsoft SQL Server™ using the same workloads used to validate the monotonicity assumption. Validation results show that submodularity holds with probability between 0.75 and 0.89 on the workloads tested.

Lemma 1 Under Assumption 2, it follows that: $\delta(q,z,X) \leq \Delta(q,\{z\})$, for any configuration X. Intuitively, Lemma 1 indicates that the CI of a singleton configuration $\{z\}$ can be used as an upper bound of the MCI of the index z. As a result, set:

$$u(q,z)=\Delta(q,\{z\})=c(q,\emptyset)-c(q,\{z\}) \qquad \text{Equation (8)}$$

There are cases where $c(q,\{z\})$ is unknown but the cost of some configuration X that contains z is known, e.g., in MCTS where configurations are explored in random order.

By Assumption 1, $$C(q,\{z\}) \geq \max_{z \in X} c(q,X)$$

Therefore, Equation 8 can be genericized to have a Submodular Upper Bound:

$$u(q,z) = c(q,\emptyset) - \max_{z \in X} c(q,X)$$
$$= \min_{z \in X}(c(q,\emptyset) - c(q,X))$$
$$= \min_{z \in X} \Delta(q,X).$$

That is, the MCI of an index should be no larger than the minimum CI of all the configurations that contain the index. To summarize, assuming monotonicity and submodularity of the cost function c, set $u(q,z)$ as follows:

$$u(q,z) = \min\left\{c(q,\emptyset), \Delta(q,\Omega), \Delta(q,\{z\}), \min_{z \in X}\Delta(q,X)\right\} \qquad \text{Equation (9)}$$

This section below pertains to confidence-based what-if call skipping. Intuitively, the confidence of skipping the what-if call for a QCP (q,C) by the Wii 104 depends on the closeness between the lower bound $L(q,C)$ and the upper bound $U(q,C)$, i.e., the derived cost $d(q,C)$. A gap between $U(q,C)$ and $L(q,C)$ is defined as $$G(q,C)=U(q,C)-L(q,C).$$

Clearly, the larger the gap is, the lower the confidence is. Therefore, it is natural to define the confidence as $$\alpha(q,C) = 1 - \frac{G(q,C)}{U(q,C)} = \frac{L(q,C)}{U(q,C)}. \qquad \text{Equation (10)}$$

Following this definition, $0 \leq \alpha(q,C) \leq 1$. Two special cases will also be discussed: (1) $\alpha(q,C)=0$, which implies $L(q,C)=0$; and (2) $\alpha(q,C)=1$, which implies $L(q,C)=U(q,C)$. Let $\alpha \in [0,1]$ be a threshold for the confidence, i.e., it is the minimum confidence for skipping a what-if call where $\alpha(q,C) \geq \alpha$ is required. Intuitively, the higher a is, the higher confidence that a what-if call can be skipped. In experimental evaluations, a can be varied to test the effectiveness of this confidence-based interception mechanism. In some implementations, alpha can be provided by a user, but can also be set to a default value of 0.9.

Two example optimization techniques for calculating the generic lower bound can be used and are agnostic to budget-aware configuration enumeration algorithms. These optimization techniques rely on general assumptions (i.e., monotonicity and submodularity) of the cost function c.

One optimization is dedicated to budget-aware greedy search (i.e., vanilla/two-phase greedy), which is of practical importance due to adoption in commercial index tuning software. The other optimization is more general and can also be used for other configuration enumeration algorithms such as MCTS.

Some of the MCI upper bounds $u(q,z)$ disclosed herein are agnostic to budget-aware configuration enumeration algorithms—they only rely on general assumptions of the cost function c. Most existing algorithms, however, employ a greedy search strategy, which offers opportunities for further optimization of $u(q,z)$ by utilizing special properties of greedy search.

The Wii 104 can perform an optimization procedure for maintaining the MCI upper-bound $u(q,z)$, which is the basic building block of the lower bound, in vanilla greedy and two-phase greedy processes. Procedure 1: for each index z that has not been selected by greedy search, $u(q,z)$ can be updated with respect to the current configuration selected by greedy search as follows. First, the Wii 104 can initialize $u(q,z)=\min\{c(q,\emptyset),\Delta(q,\Omega)\}$ for each index z. Second, during each greedy step $1 \leq k \leq K$, update $u(q,z)=c(q,C_{k-1})-c(q,C_{k-1}\cup\{z\})=\delta(q,z,C_{k-1})$, if both $c(q,C_{k-1})$ and $c(q,C_{k-1}\cup\{z\})$ are available.

In the second step, $C_k$ is the configuration selected by greedy search in step k and set $C_0=\emptyset$. A special case is when k=1, if $c(q,\{z\})$ is known then $u(q,z)=c(q,\emptyset)-c(q,\{z\})=\Delta(q,$ {z}) can be updated, which reduces to the general upper bound (see Lemma 1). Theorem 1: Under Assumptions 1 and 2, Procedure 1 is correct, i.e., the u(q,z) after each update remains an MCI upper bound with respect to any future configuration X explored by greedy search.

The tightness of the MCI upper bounds depends on the knowledge about c(q,{z}), namely, what-if costs of singleton configurations with one single index. Unfortunately, such information is often unavailable, and the MCI upper bound in Equation 9 is reduced to a naive version (Equation 6). For vanilla greedy and two-phase greedy, this implies that none of the QCP's with singleton configurations can be skipped under a reasonable confidence threshold (e.g., 0.8), which can take a large fraction of the budget, although the bounds are effective at skipping what-if calls for multi-index configurations.

For MCTS, configurations are explored in a random order. This means that skipping can be less effective for multi-index configurations. The reason is that these configurations are more likely to contain indexes with unknown what-if costs. This is in contrast to greedy search, where multi-index configurations are always explored after singleton configurations.

To overcome this limitation, refinement techniques can be used, based on estimating the what-if cost c(q,{z}) if it is unknown, by introducing the notion of "coverage." For all algorithms, MCI is trivial until a cost of singleton configuration on a query is known. For vanilla and two-phase greedy, step 1 cannot be skipped and what-if call skipping is useless when the budget is small. For MCTS, it means a budget used to collect "prior reward" is wasted due to spurious singletons and further non-trivial bound cannot be had during exploration since most singletons are unseen.

Assume that $c(q,\Omega)$ is known for each query q. Moreover, assume that the subset $\Omega_q \subset \Omega$ of indexes that appear in the optimal plan of q by using indexes in $\Omega$. Clearly, $c(q,\Omega) = c(q,\Omega_q)$.

For an index z, define its coverage on the query q as:

$$\rho(q, z) = \frac{c(q, \emptyset) - c(q, \{z\})}{c(q, \emptyset) - c(q, \Omega_q)} = \frac{\Delta(q, \{z\})}{\Delta(q, \Omega_q)} \quad \text{Equation (11)}$$

In other words, coverage measures the relative cost improvement of z with respect to the maximum possible cost improvement over q delivered by $\Omega_q$. If the coverage $\rho(q,z)$ is known, the cost c(q,{z}) can be recovered as:

$$c(q, \{z\}) = c(q, \emptyset) - \rho(q, z) \cdot (c(q, \emptyset) - c(q, \Omega_q))$$
$$= (1 - \rho(q, z)) \cdot c(q, \emptyset) + \rho(q, z) \cdot c(q, \Omega_q)$$

In the following paragraphs, techniques are described that can be used by the Wii 104 to estimate $\rho(q,z)$ based on the similarities between index configurations, in particular {z} and $\Omega_q$.

The Wii 104 can estimate coverage based on the assumption that coverage depends on the similarity between {z} and $\Omega_q$. Specifically, let Sim ({z},$\Omega_q$) be some similarity measure that is between 0 and 1, and:

$$\rho(q,z) = Sim(\{z\},\Omega_q).$$

The problem is then reduced to developing an appropriate similarity measure. A representation can be used to convert an index z into a feature vector $\vec{z}$. Specifically, one-hot encoding can be used based on all indexable columns identified in the given workload W. Let $\mathcal{D} = \{c_1, \ldots, c_L\}$ be the entire domain of these L indexable columns. For a given index z, $\vec{z}$ is an L-dimensional vector. If some column $c_l \in \mathcal{D}$ ($1 \leq l \leq L$) appears in z, then $\vec{z}[l]$ receives some non-zero weight $w_l$ based on the weighing policy described below:

If $c_l$ is the j-th key column of z, $$w_l = \frac{1}{2^{j-1}};$$

If $c_l$ is an included column of z, $$w_l = \frac{1}{2^J}$$

where J is the number of key columns contained by z; otherwise, set $\vec{z}[l]=0$.

Note that the above weighing policy considers the columns contained by an index as well as their order. Intuitively, leading columns in index keys play a more important role than other columns (e.g., for a "range predicate", an access path chosen by the query optimizer needs to match the "sort order" specified in the index key columns).

Feature vectors of individual indexes can be combined to generate a feature vector for the entire configuration. Specifically, consider a configuration $C = \{z_1, \ldots, z_m\}$ and let $\vec{z}_i$ be the feature representation of the index $z_i$ ($1 \leq i \leq m$). The feature representation $\vec{C}$ of C is again an L-dimensional vector where:

$$\vec{C}[l] = \max\{\vec{z}_1[l], \ldots, \vec{z}_m[l]\}, \text{ for } 1 \leq l \leq L.$$

That is, the weight $\vec{C}[l]$ is the largest weight of the l-th dimension among the indexes contained by C. In particular, the feature vector $\vec{\Omega}_q$ for $\Omega_q$ can be generated.

A query q can be represented as a feature vector $\vec{q}$. Specifically, one-hot encoding can be used for the query q with the same domain $\mathcal{D} = \{c_1, \ldots, c_L\}$ of all indexable columns. If some column $c \in \mathcal{D}$ appears in the query q, this implementation assigns a nonzero weight to $\vec{q}[l]$; otherwise, $\vec{q}[l]=0$. Here, the same weighing mechanism used by ISUM (Index Selection using Machine learning) can be used. That is, the weight of a column is computed based on a corresponding table size and the number of candidate indexes that contain the column. To be sure, a column from a larger table and contained by more candidate indexes is more important and thus is assigned a higher weight.

Before measuring the similarity, the Wii 104 projects $\vec{z}$ and $\vec{\Omega}_q$ onto $\vec{q}$ to get their images under the context of the query q. The projection is done by taking the element-wise dot product, i.e., $\tilde{z} = \vec{z} \cdot \vec{q}$ and $\tilde{\Omega}_q = \vec{\Omega}_q \cdot \vec{q}$. Note that $\tilde{z}$ and $\tilde{\Omega}_q$ remain vectors. The similarity measure is defined as:

$$Sim(\{z\}, \Omega_q) = \frac{\langle \tilde{z}, \tilde{\Omega}_q \rangle}{|\tilde{\Omega}_q|^2} = \frac{|\tilde{z}| \cdot |\tilde{\Omega}_q| \cos\theta}{|\tilde{\Omega}_q|^2} = \frac{|\tilde{z}| \cos\theta}{|\tilde{\Omega}_q|},$$

Equation (12) where θ represents the angle between the two vectors $\tilde{z}$ and $\tilde{\Omega}_q$.

Figure 5A:
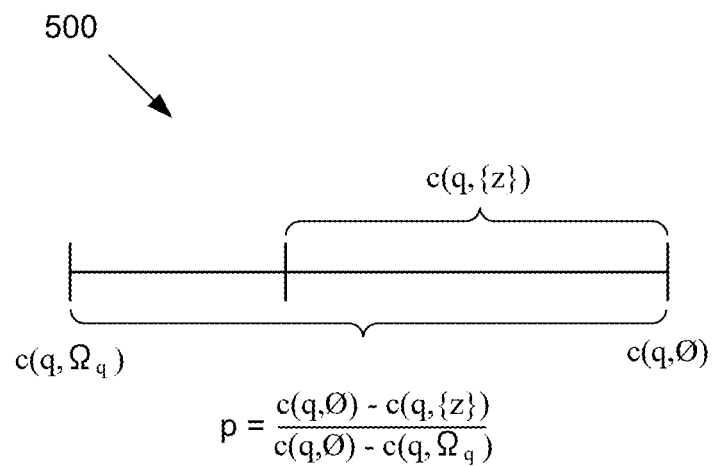
FIGS. 5A and 5B collectively illustrate and contrast the definition and estimation of coverage.
Figure 5B:
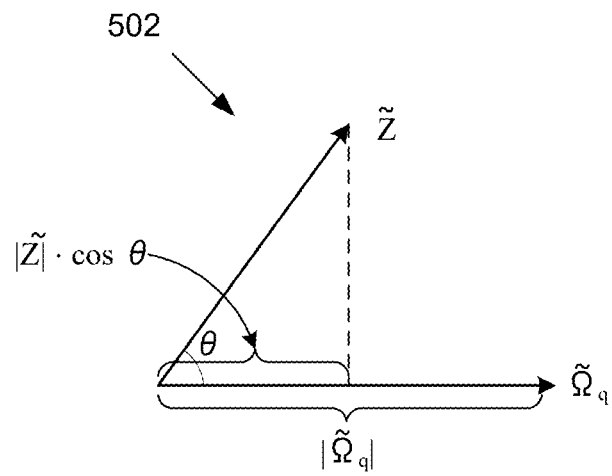

FIGS. 5A and 5B collectively illustrate and contrast the definition and estimation of coverage. FIG. 5A depicts an observation 500 that c(q,{z}) must lie between c(q,$\Omega_q$) and c(q,∅), and coverage measures the cost improvement Δ(q, $\Omega_q$) of $\Omega_q$ that is covered by the cost improvement Δ(q,{z}) of {z}. On the other hand, FIG. 5B depicts a geometric view 502 involved in the estimation of coverage using the similarity metric Sim ({z},$\Omega_q$). Intuitively, the similarity measures how much "length" of the configuration $\Omega_q$ is covered by the "length" of the index z when projected to the (same) "direction" of $\Omega_q$ in the feature vector space. Note that it is not important whether the lengths are close to the corresponding cost improvements—only their ratio matters. The estimated coverage using Equation 12 is close to the ground-truth coverage in Equation 11.

The following paragraphs pertain to example integrations, as well as design considerations and implementation details when integrating the Wii 104 with existing budget-aware configuration search algorithms. Example API functions provided by the Wii 104 are described, as well as how existing budget-aware configuration enumeration algorithms can leverage the Wii 104 API's without modification to the algorithms.

Referring briefly to FIG. 1, the Wii 104 is located between the index tuner 102 and the query optimizer 108. The Wii 104 offers two API functions that can be invoked by a budget-aware configuration enumeration algorithm 114: (1) InitMCIBounds that initializes the MCI upper-bounds u(q, z); and (2) EvalCost that obtains the cost of a QCP (q,C) in a budget-aware manner by utilizing the lower bound L(q,C) and the upper bound U(q,C), i.e., the derived cost d(q,C).

Example code for implementing the InitMCIBound API is provided below:

| Algorithm 1: InitMCIBounds(W, I) |
|---|
| Input: W, the workload; I, the candidate indexes. |
| Output: u, the initialized MCI upper bounds. |
| 1  foreach q ∈ W do |
| 2      Iq ←GetCandidateIndexes(q, I) |
| 3      foreach z ∈ $I_q$ do |
| 4          If c(q, $\Omega_q$) is available then |
| 5              u(q, z) ← c(q, ∅) − c(q, $\Omega$q); |
| 6          else |
| 7              u(q, z) ← c(q, ∅); |

In the InitMCIBound API the Wii 104 initializes the MCI upper bound u(q,z) for each query q∈W and each of its candidate indexes z ∈ $I_q$. If c(q,$\Omega_q$) is available, it uses the naive upper bound (Equation 6); otherwise, it uses c(q,∅).

Example code for implementing the EvalCost Function API is provided below:

| Algorithm 2: EvalCost(q, C, B, α, S ← ∅) |
|---|
| Input: q, the query; C, the configuration; B, the budget on the number of what-if calls; α, the threshold on the confidence α(q, C); S, an (optional) subset of C with known what-if cost c(q, S), which defaults to the existing configuration ∅. |
| Output: cost(q, C), the cost of q w.r.t. C; B', the remaining budget. |
| 1  if c(q, C) is known then |
| 2      UpdateMCIBounds(C, S); |
| 3      return (cost(q, C) ← c(q,C), B' ← B); |
| 4  if B is zero then |
| 5      return (cost(q,C) ← d(q,C), B' ← 0); |
| 6  ## c(q, C) is unknown and we still have budget |
| 7  U(q, C) ← d(q, C); |
| 8  L(q, C) ← max{0, c(q, $\Omega_q$), c(q, S) − $\Sigma_{x \in C-S}$u(q, x)}; |
| 9  $\alpha(q, C) = \dfrac{L(q, C)}{U(q, C)} \geq \alpha$ then |
| 10     ## The confidence is high enough. |
| 11     return (cost(q, C) ← d(q,C), B' ← B) |
| 12     ## Need to go to the query optimizer to get c(q, C). |
| 13     c(q, C) ← WhatIfCall(q, C); |
| 14     UpdateMCIBounds(C, S); |
| 15     return (cost(q, C) ← c(q, C), B' ← B − 1); |
| 16 |
| 17 UpdateMCIBounds(C, S); |
| 18 ## Update the MCI bounds based on c(q, C) and c(q, S) |
| 19 foreach x ∈ C − S do |
| 20     u(q, x) ← min{u(q, x), c(q, S) − c(q, C)} |

In the EvalCost Function Algorithm, if the what-if cost c(q,C) is known, the Wii 104 uses the what-if cost and updates the MCI upper-bounds (lines 1 to 3). Otherwise, the Wii 104 checks whether the budget B on the number of what-if calls has been reached and returns the derived cost d(q,C) if the Wii 104 determines that the budget has been reached (lines 4 to 5). On the other hand, if there is remaining budget, i.e., B>0, the Wii 104 then tries to use the upper-bound U(q,C) and the lower-bound L(q,C) to see whether the what-if call for (q,C) can be skipped. If the what-if call can be skipped, the derived cost d(q,C) is returned (lines 6 to 11)—the budget B remains the same in this case. Finally, if the confidence of skipping is low, the Wii 104 makes one what-if call to obtain c(q,C) (lines 12 to 13) and update the MCI upper bounds (line 14). As a result, the Wii 104 deducts one from the current budget B (line 15).

The optional input parameter S represents a subset configuration of C and is set to be the existing configuration ∅ by default. The use of optional input parameter S will be described in greater detail infra. To demonstrate how to use the Wii 104 APIs without modifying the existing budget-aware configuration search algorithms, the GreedySearch Algorithm 3 sets forth how the APIs can be used by budget-aware greedy search, a basic building block of the existing algorithms. Example code for implementing a GreedySearch is provided below:

| Algorithm 3: GreedySearch(W, I, K, B, α) |
|---|
| Input: W, the workload; I, the candidate indexes; K, the cardinality constraint; B, the budget on the number of what-if calls; α, the confidence threshold. |
| Output: C*, the best configuration; B', the remaining budget. |
| 1  InitMCIBounds(W, I); |
| 2  C* ← ∅, cost* ← cost(W, ∅), B' ← B |
| 3  while I ≠ ∅ and |C*| < K do |
| 4      C ← C*, cost ← cost* |
| 5      foreach index z ∈ I do |
| 6          $C_z$ ← C* ∪ {z}; |
| 7          cost(W, $C_z$) ← 0; |
| 8          foreach q ∈ W do |
| 9              (cost(q, $C_z$), B') ← EvalCost(q, $C_z$, B', α, C*); |
| 10             cost(W, $C_z$) ← cost(W, $C_z$) + cost(q, $C_z$); |
| 11         if cost(W, $C_z$) < cost then |
| 12             C ← $C_z$, cost ← cost(W, $C_z$); |

| Algorithm 3: GreedySearch(W, I, K, B, α) |
| --- |
| 13      if cost ≥ cost* then |
| 14          return C*, B'; |
| 15      else |
| 16          C* ← C, cost* ← cost, I ← I – C* |
| 17  return (C*, B') |

In this example, the InitMCIBounds API is invoked at line 1, whereas the EvalCost API is invoked at line 9, which are the only two differences compared to regular budget-aware greedy search. Therefore, there is no intrusive change to the greedy search procedure itself.

First, when calling the Wii 104 to evaluate cost at line 9, the code passes C* to the optional parameter S in Algorithm 3. Note that this is just a special case of Equation 5 for greedy search, as stated by the following theorem:

Theorem 2 In the context of greedy search, Equation 5 reduces to $$L(q,C_z)=c(q,C^*)-\Sigma_{x\in C_z-C^*}u(q,x)=c(q,C^*)-u(q,z),$$

where $C_z=C^*\cup\{z\}$ and C* is the latest configuration selected by budget-aware greedy search.

Second, in the context of greedy search, the update step at line 20 of Algorithm 1 becomes:

$$u(q,x)\leftarrow\min\{u(q,x),c(q,C^*)-c(q,C)\}.$$

The correctness of this update has been given by Theorem 1.

It will be understood that the vanilla greedy algorithm after integration with the Wii 104 is the same as the GreedySearch procedure outlined above. Algorithm 4 presents the details of the two-phase greedy algorithm after integrating with the Wii 104. There is no change to the two-phase greedy except for using the version of GreedySearch in Algorithm 3. The function GetCandidateIndexes selects a subset of candidate indexes $I_q$ from I, considering only the indexable columns contained by the query q.

| Algorithm 4: TwoPhaseGreedy(W, I, K, B, α) |
| --- |
| Input:  W, the workload; I, the candidate indexes; K, the cardinality constraint; B, the budget on the number of what-if calls; α, the confidence threshold. |
| Output: C*, the best configuration; B', the remaining budget. |
| 1  $I_w$ ← ∅, B' ← B; |
| 2  foreach q ∈ W do |
| 3      $I_q$ ←GetCandidateIndexes(q, I); |
| 4      ($C_q$, B') ←GreedySearch({q}, $I_q$, K, B', α); |
| 5      $I_w$ ← $I_w$ ∪ $C_q$; |
| 6  (C*, B') ←GreedySearch(W, $I_w$, K, B', α); |
| 7  return (C*, B') |

MCTS Algorithm 5 presents the skeleton of MCTS after the Wii 104 functionalities are integrated.

| Algorithm 5: MCTS(W, I, K, B, τ) |
| --- |
| Input:  W, the workload; I, the candidate indexes; K, the cardinality constraint; B, the budget on the number of what-if calls; α, the confidence threshold. |
| Output: C*, the best configuration; B', the remaining budget. |
| 1  B' ← B; |
| 2  InitMCTS(W, I); |
| 3  while B' > 0 do |
| 4      (q, C) ←SelectQueryConfigByMCTS(W, I, K); |
| 5      (cost(q, C), B') ←EvalCost(q, C, B', α, ∅); |

| Algorithm 5: MCTS(W, I, K, B, τ) |
| --- |
| 6      UpdateRewardForMCTS(q, C, cost(q, C)); |
| 7  (C*, B') ←GreedySearch(W, I, K, B', α); |
| 8  return (C*, B'); |

Again, there is no change to the MCTS algorithm except for that cost evaluation at line 5 is delegated to the EvalCost API of the Wii 104 functions. Note that here the existing configuration ∅ can be passed to the optional parameter S in Algorithm 2, which makes line 8 of Algorithm 2 on computing L(q,C) become:

$$L(q,C)\leftarrow\max\{0,c(q,\Omega_q),c(q,\emptyset)-\Sigma_{x\in C}u(q,x)\}.$$

Essentially, this means that Equation 4 for L(q,C) can be used, instead of a generalized version shown in Equation 5, although Equation 5 can be used. It will be understood that MCTS configurations and queries are explored in a random order. Therefore, the subsets S with respect to a given pair of q and C with known what-if costs c(q,S) are sparse. As a result, Equation 5 often reduces to Equation 4 when running Wii 104 underlying MCTS.

Figure 6:
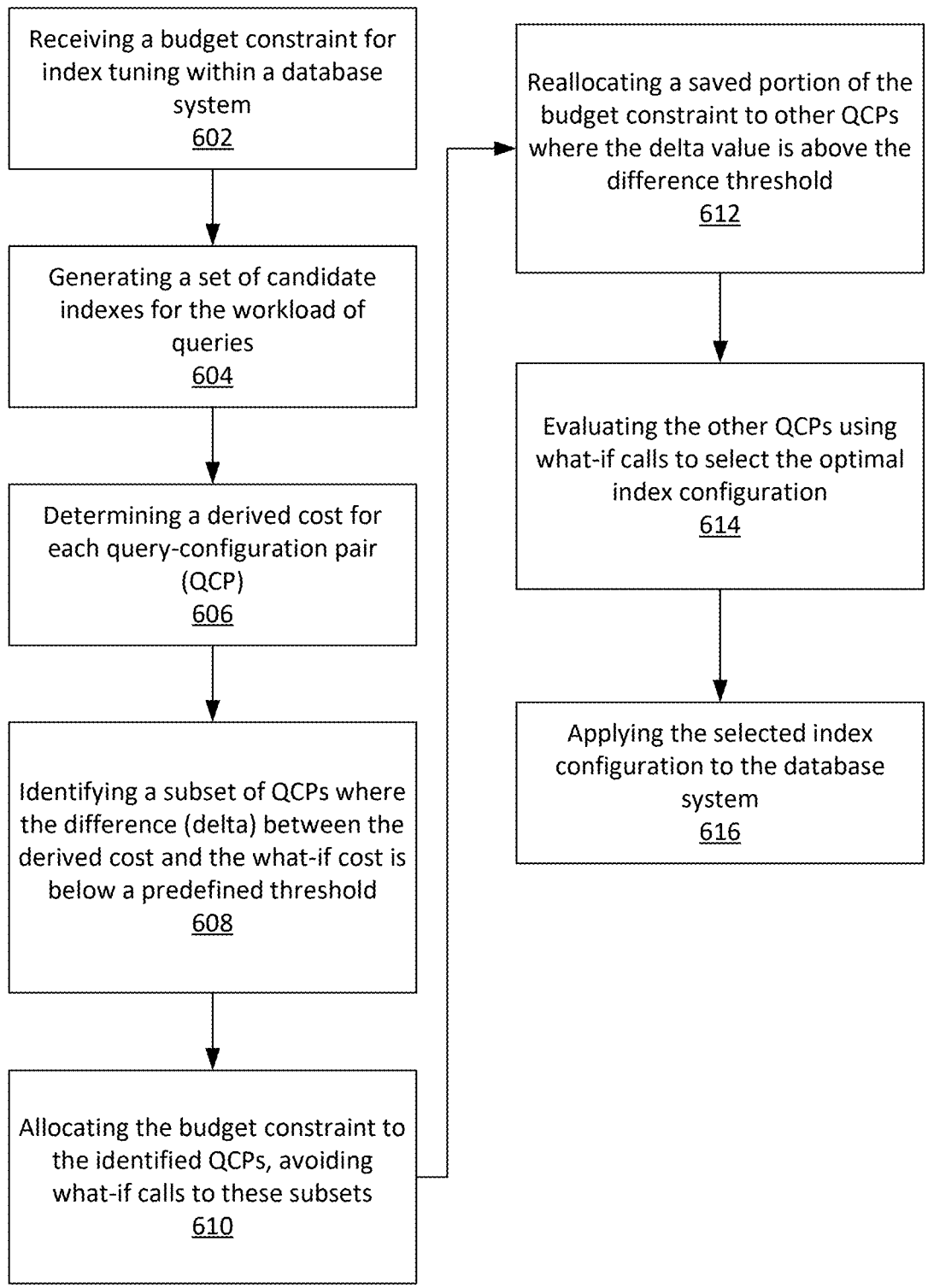
FIG. 6 is a flowchart of an example method that is consistent with some implementations of the present concepts.

FIG. 6 is a flowchart of an example method. The method begins with step 602 of receiving a budget constraint for index tuning within a database system. This step involves determining the limits on computational resources, such as time or processing power, that can be allocated to the index tuning process. By establishing a clear budget constraint, the method ensures that the index tuning activities are performed efficiently and within the predefined resource limits, optimizing the overall performance without exceeding the available budget.

Next, step 604 involves generating a set of candidate indexes for the workload of queries. This step uses insights from the workload analysis to create potential indexes that can improve query performance. These candidate indexes are based on various indexing strategies, including single-column indexes, composite indexes, and covering indexes, tailored to the specific needs of the queries.

The method then includes step 606 of determining a derived cost for each query-configuration pair (QCP). This step involves estimating the computational expense of executing a query with a given index configuration using cost derivation techniques. These derived costs provide an approximation of the actual costs, enabling efficient decision-making without performing full what-if analyses.

Following the cost determination, step 608 identifies a subset of QCPs where the difference (delta) between the derived cost and the what-if cost is below a predefined threshold.

Step 610 allocates the budget constraint to the identified QCPs, avoiding what-if calls to these subsets. By focusing resources on the most promising QCPs, the method optimizes the use of the available budget and reduces unnecessary computations.

A saved portion of the budget constraint is reallocated in step 612 to other QCPs where the delta value is above the difference threshold. This step ensures that QCPs with larger discrepancies between the derived and actual costs are also evaluated, balancing the thoroughness and efficiency of the index tuning process.

Step 614 involves evaluating the other QCPs using what-if calls to select the optimal index configuration. By simulating the execution of queries with different index configurations, this step identifies the set of indexes that offer the best performance improvements within the given budget constraints. Finally, step 616 applies the selected index configuration to the database system. This step implements the optimal indexes, enhancing the system's overall performance and ensuring that the queries are executed more efficiently.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 7:
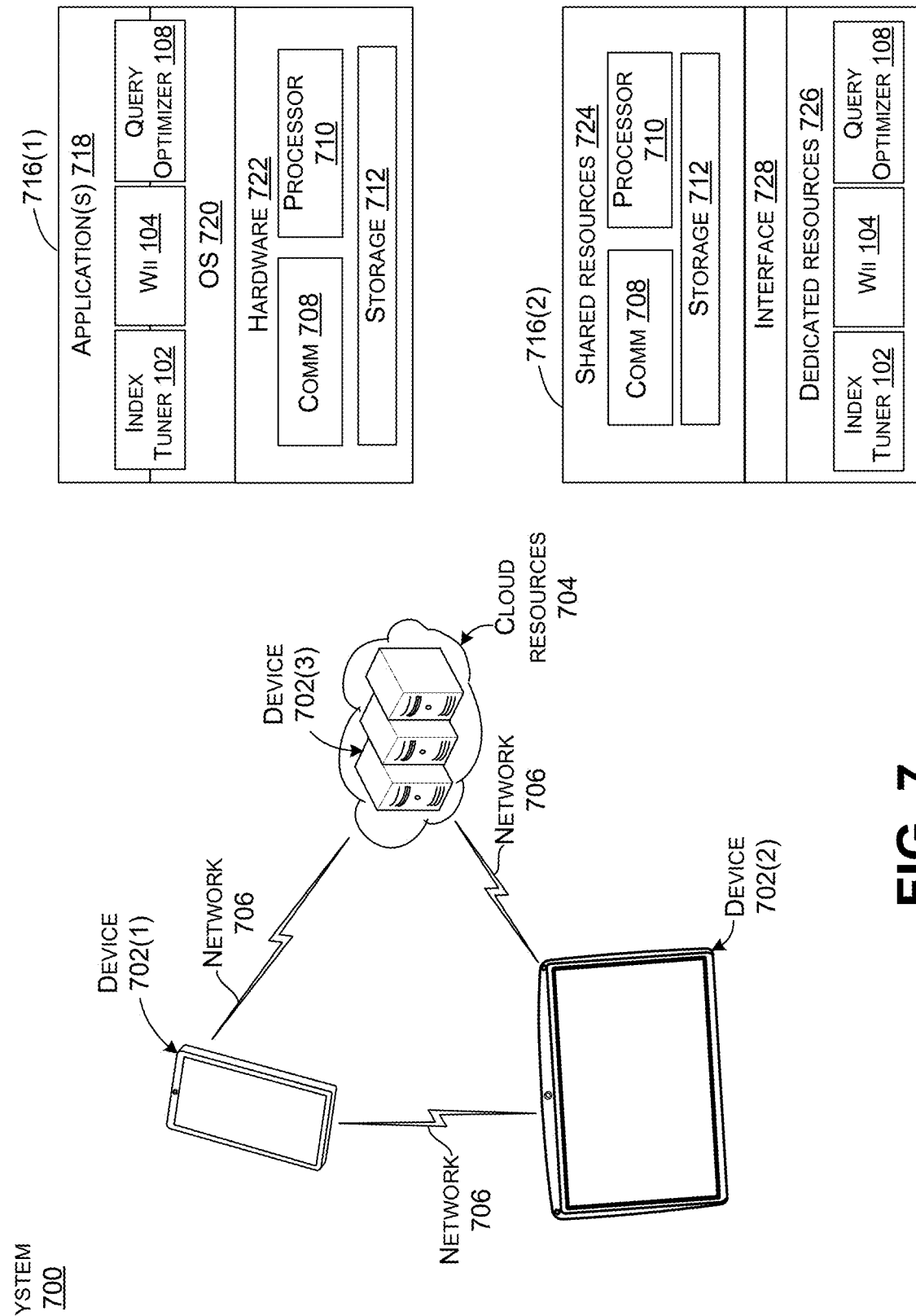
FIG. 7 illustrates example computing systems that can be used that are consistent with some implementations of the present concepts.

FIG. 7 shows an example system 700. System 700 can include computing devices 702. In the illustrated configuration, computing device 702(1) is manifest as a smartphone, computing device 702(2) is manifest as a tablet type device, and computing device 702(3) is manifest as a server type computing device, such as may be found in a datacenter as a cloud resource 704. Computing devices 702 can be coupled via one or more networks 706 that are represented by lightning bolts.

Computing devices 702 can include a communication component 708, a processor 710, storage resources (e.g., storage) 712, and/or index tuner 102, Wii 104, and/or query optimizer 108. FIG. 7 shows two device configurations 716 that can be employed by computing devices 702. Individual computing devices 702 can employ either configuration 716(1) or 716(2), or an alternate configuration. (Due to space constraints on the drawing page, one instance of each configuration is illustrated). Briefly, device configuration 716(1) represents an operating system (OS) centric configuration. Device configuration 716(2) represents a system on a chip (SOC) configuration. Device configuration 716(1) is organized into one or more applications 718, operating system 720, and hardware 722. Device configuration 716(2) is organized into shared resources 724, dedicated resources 726, and an interface 728 therebetween.

In configuration 716(1), the index tuner 102, the Wii 104, and/or the query optimizer 108 can be manifest as part of the operating system 720. Alternatively, the index tuner 102, Wii 104, and/or query optimizer 108 can be manifest as part of the applications 718 that operates in conjunction with the operating system 720 and/or processor 710. In configuration 716(2), the index tuner 102, the Wii 104, and/or the query optimizer 108 can be manifest as part of the processor 710 or a dedicated resource 726 that operates cooperatively with the processor 710.

In some configurations, the computing devices 702 can have an instance of the index tuner 102, Wii 104, and/or query optimizer 108. However, the functionalities that can be performed by the index tuner 102, Wii 104, and/or query optimizer 108 may be the same or they may be different from one another when comparing computing devices. For instance, in some cases, the index tuner 102, Wii 104, and/or query optimizer 108 can be robust and provide all of the functionality described above and below (e.g., a device-centric implementation).

In other cases, some devices can employ a less robust instance of the index tuner 102, Wii 104, and/or query optimizer 108 that relies on some functionality to be performed by the index tuner 102, Wii 104, and/or query optimizer 108 on another device. In one such instance, the index tuner 102, Wii 104, and/or query optimizer 108 on device 702(3) (e.g., on cloud resources 704) may oversee model training.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on/in storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 716(2) can be thought of as a system on a chip (SOC) type design. In such a case, functionality provided by the device can be integrated on a single SOC or multiple coupled SOCs. One or more processors 710 can be configured to coordinate with shared resources 724, such as storage 712, etc., and/or one or more dedicated resources 726, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Experimental Evaluations

Experimental results were generated and used to evaluate the use of Wii when integrated with existing budget-aware configuration search algorithms. Experiments were performed using Microsoft SQL Server 2017™ under Windows Server 2022™, running on a workstation equipped with 2.6 GHz multi-core AMD CPUs and 256 GB main memory. The general reference to Wii is understood to refer to the use of what-if query interception and index optimization as described above.

Standard benchmarks and real workloads were utilized in this study. Table 1 summarizes the information of the workloads. For benchmark workloads, both the TPC-H and TPC-DS benchmarks with a scaling factor of 10 were used.

TPC-H and TPC-DS are benchmark standards developed by the Transaction Processing Performance Council (TPC) to evaluate the performance of database systems.

Additionally, two real workloads, denoted by Real-D and Real-M in Table 1, were employed. These real workloads are significantly more complex compared to the benchmark workloads in terms of schema complexity (e.g., the number of tables), query complexity (e.g., the average number of joins and table scans contained in a query), and database/workload size. Furthermore, the number of candidate indexes for each workload is reported, serving as an indicator of the size of the corresponding search space faced by an index configuration search algorithm.

Two state-of-the-art budget-aware configuration search algorithms described above were used: (1) two-phase greedy, which has been adopted by commercial index tuning software, and (2) MCTS, which demonstrates better performance than two-phase greedy. Vanilla greedy has been omitted as vanilla greedy is significantly inferior to two-phase greedy. Both two-phase greedy and MCTS use derived cost as an estimate for the what-if cost when the budget on what-if calls is exhausted. The evaluation of Wii was conducted when integrated with the configuration search algorithms.

In the experiments, the cardinality constraint K is set to {10, 20}. Since the TPC-H workload is relatively small compared to the other workloads, the budget B on the number of what-if calls is varied within {500, 1000}; for the other workloads, the budget B is varied within {500, 1000, 2000, 5000}.

TABLE 1

| Name | DB Size | # Queries | # Tables | Avg. # Joins | Avg. # Scans | # Candidate Indexes |
|---|---|---|---|---|---|---|
| TPC-H | sf = 10 | 22 | 8 | 2.8 | 3.7 | 168 |
| TPC-DS | sf = 10 | 99 | 24 | 7.7 | 8.8 | 848 |
| Real-D | 587 GB | 32 | 7912 | 15.6 | 17 | 417 |
| Real-M | 26 GB | 317 | 474 | 20.2 | 21.7 | 4490 |

The evaluation metric used in the experiments is the percentage improvement of the workload based on the final index configuration found by a search algorithm, defined as:

$$\eta(W, C) = \left(1 - \frac{c(W, C)}{c(W, \emptyset)}\right) \times 100\%, \quad (13)$$

where $c(W,C) = \sum_{q \in W} c(q,C)$. Note that here the query optimizer's what-if cost estimate $c(q,C)$ has been used as the gold standard of query execution cost, instead of using the actual query execution time, to be in line with previous work on evaluating index configuration enumeration algorithms.

Figure 8:
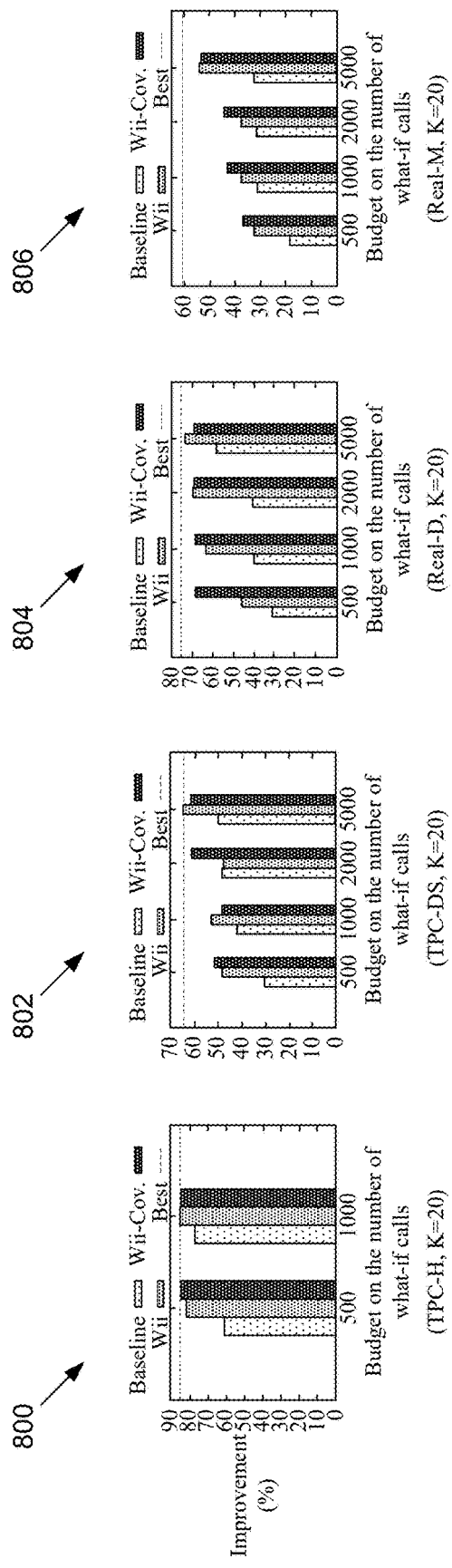
FIG. 8 illustrates graphs of example evaluations for two-phase greedy.

FIG. 8 presents the evaluation results of Wii for two-phase greedy when setting the confidence threshold α=0.9. FIG. 8 includes graphs 800-806. The results indicate that Wii significantly outperforms the baseline (i.e., two-phase greedy without what-if call interception). For example, when setting K=20 and B=5,000, Wii improves the percentage improvement over the baseline from 50% to 65% on TPC-DS, from 58% to 74% on Real-D, and from 32% to 54% on Real-M; even for the smallest workload TPC-H, when setting K=20 and B=1,000, Wii improves over the baseline from 78% to 86%. Note that here Wii utilizes the optimization for greedy search. Integrating Wii with two-phase greedy is particularly noteworthy due to the adoption of two-phase greedy in commercial database tuning software such as Microsoft's DTA™.

Additionally, incorporating the coverage-based refinement described above can further enhance Wii in certain cases. For instance, on TPC-DS when setting K=20 and B=2,000, coverage-based refinement improves Wii by 13%, from 49% to 62%, whereas Wii and the baseline perform similarly. On Real-D when setting K=10 and B=500 coverage-based refinement improves Wii by an additional 17.8%, from 45.3% to 63.1%, translating to a 32.2% improvement over the baseline, which improves from 30.9% to 63.1%.

Figure 10:
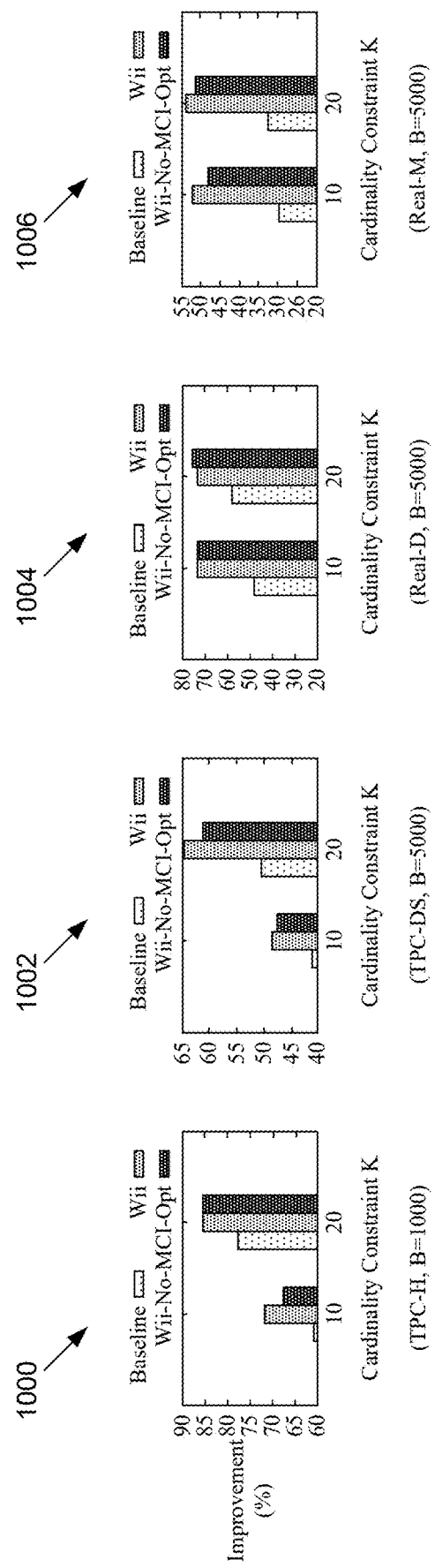
FIG. 10 illustrates graphs of example evaluations of performance with and without optimization.

The impact of the optimization proposed for two-phase greedy was further studied. In the experiment, the parameters were set to α=0.9, B=1,000 for TPC-H, and B=5,000 for the other workloads. FIG. 10 presents the results. FIG. 10 includes graphs 1000-1006. It was observed that the optimization for MCI upper bounds offers a benefit in two-phase greedy on TPC-H, TPC-DS, and Real-M. Given its minimal computational overhead, this optimization is recommended to be enabled by default in Wii.

Figure 9:
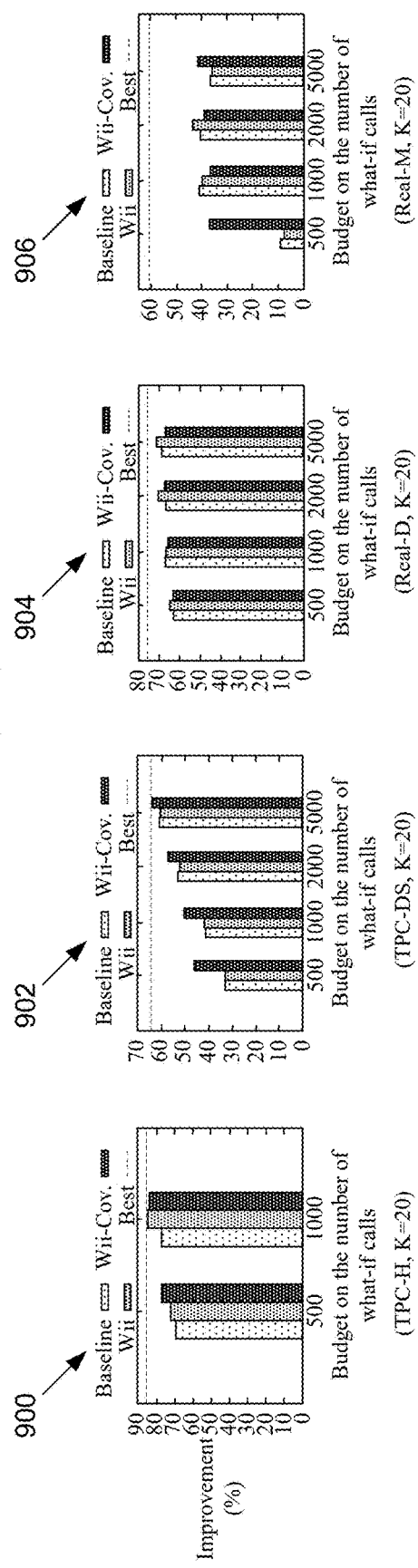
FIG. 9 illustrates graphs of example evaluations for MCTS.

FIG. 9 also presents the results of Wii for MCTS, with the confidence threshold set to α=0.9. FIG. 9 includes graphs 900-906. Unlike the case with two-phase greedy, for MCTS, Wii often performs similarly to the baseline (i.e., MCTS without what-if call interception). This outcome is expected, as MCTS already significantly outperforms two-phase greedy in many scenarios, making further improvement more challenging. However, there are notable cases where significant improvement is observed by incorporating the coverage-based refinement into Wii. For instance, on Real-M, when setting K=10 and B=500, the percentage improvement of the final index configuration found by MCTS increased from 7.8% to 27.1%; a similar trend is observed when increasing K to 20, where the improvement rose from 8.5% to 36.9%.

In general, Wii proves more effective on the two larger workloads (TPC-DS and Real-M), which involve more complex queries and thus larger search spaces. In these scenarios, the number of configurations MCTS can explore within the budget constraint is relatively small compared to the entire search space. Wii enhances MCTS's ability to find a better configuration by skipping unnecessary what-if calls.

On Real-M, the coverage-refined Wii significantly outperforms other algorithms, especially when the budget for what-if calls is limited. For example, when setting K=20, τ=10, and B=5,000, the coverage-refined Wii increases the percentage improvement from 37% to 55%. For MCTS, the bound-based Wii is less effective at skipping what-if calls for multi-index configurations because such configurations often contain indexes (i.e., singleton configurations) with unknown what-if costs. This forces the bound-based Wii to use the most conservative MCI upper bounds. This limitation is not present in either vanilla greedy or two-phase greedy, where the greedy-specific refinement procedure can further improve the MCI upper bounds.

Comparing FIGS. 8 and 9, the baseline version of two-phase greedy underperforms compared to MCTS. However, the Wii-enhanced version of two-phase greedy performs similarly or even better than MCTS. Existing budget allocation policies are largely macro-level optimization mechanisms, treating what-if calls as atomic black-box operations beyond their optimization scope. The results indicate that micro-level optimization mechanisms like Wii, which operate at the granularity of individual what-if calls, can interact with and significantly impact the performance of those macro-level optimization mechanisms. An in-depth study and understanding of such macro-/micro-level interactions may lead to the development of better budget allocation policies.

Furthermore, based on the evaluation results, the coverage-based refinement may not always enhance Wii's performance. Since the motivation of the coverage-based refinement is to make Wii more effective in the presence of unknown singleton-configuration what-if costs, one approach includes measuring the fraction of such singleton configurations and enabling the coverage-based refinement when this fraction is high.

Additionally, FIGS. 8 and 9 show that the coverage optimization can generally boost Wii on small budgets but becomes less effective or may even negatively impact performance as the budget increases. This occurs because coverage is only used to skip singleton configurations, which are explored mainly in the early stages of both algorithms. Consequently, this optimization can significantly improve results by advancing the tuning progress initially. However, this process may also mistakenly skip some important indexes due to inaccurate estimations, with the negative impact becoming more pronounced as more budget is allocated to multi-index configurations. Therefore, coverage optimization should be enabled when the fraction of singleton configurations in the budget allocation is large.

Figure 11:
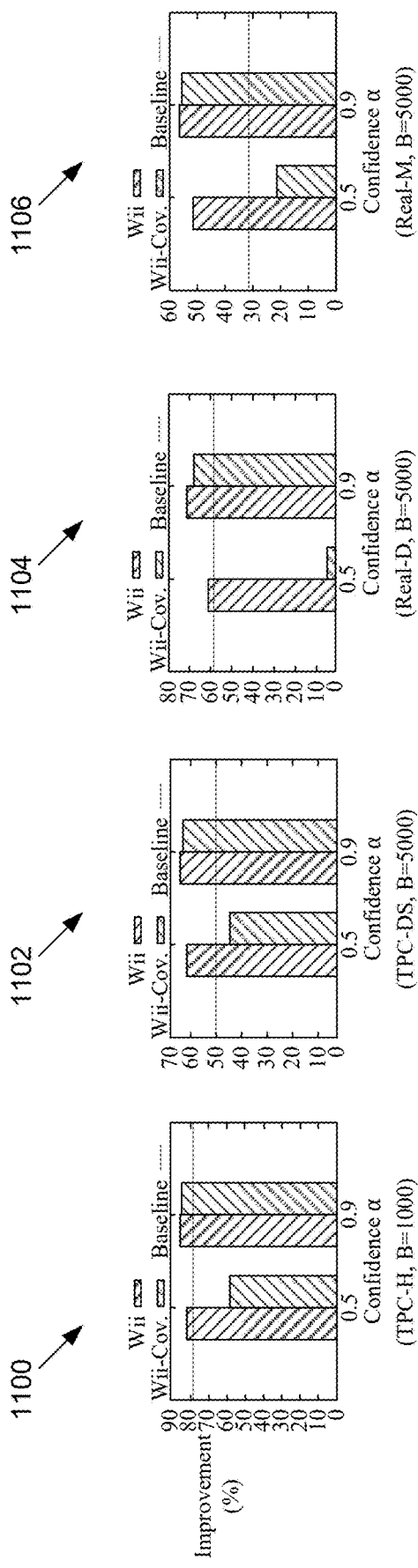
FIG. 11 illustrates graphs of example performance impacts of lowering a confidence threshold for two-phase greedy.
Figure 12:
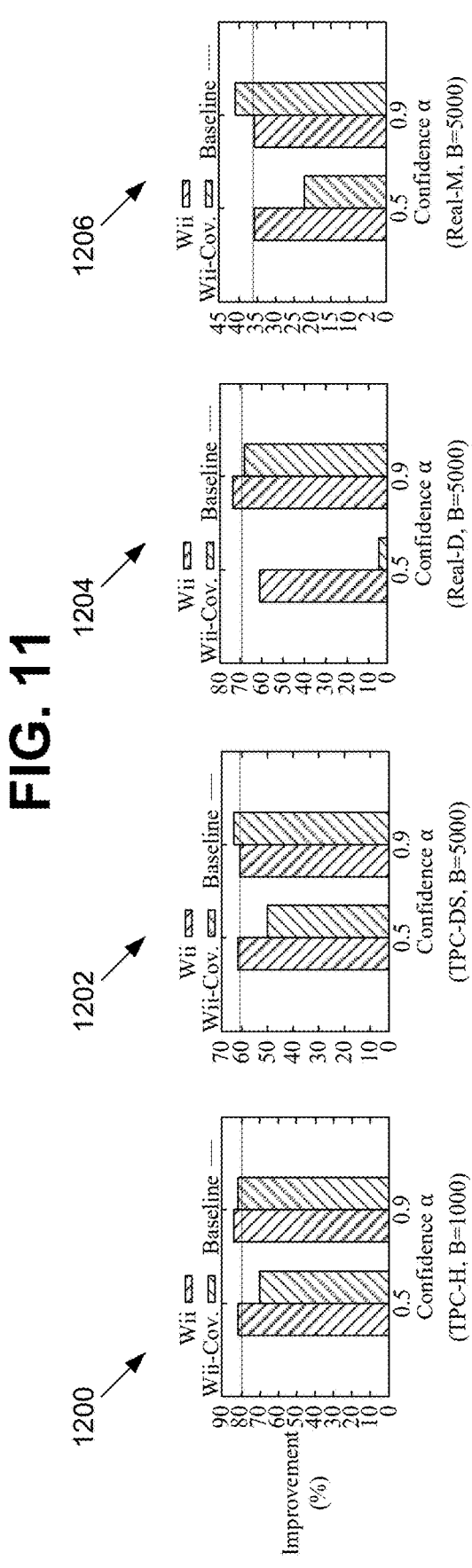
FIG. 12 illustrates graphs of example performance impacts of lowering a confidence threshold for MCTS.

The performance impact of using a lower confidence threshold is an interesting question that was investigated by conducting experiments with the confidence threshold set to $\alpha=0.5$. FIGS. 11 and 12 present results for two-phase greedy and MCTS with the cardinality constraint K=20. FIG. 11 includes graphs 1100-1106. FIG. 12 includes graphs 1200-1206. Several observations were made. First, the performance of Wii often deteriorates significantly when using a lower confidence threshold, such as $\alpha=0.5$, compared to a higher threshold like $\alpha=0.9$; in some cases, it even performs worse than the baseline, as seen with MCTS on Real-D in FIG. 12 (see 1204). Second, coverage-based refinement appears to be more sensitive to the use of a low confidence threshold due to its inherent uncertainty in estimating singleton-configuration what-if costs.

Figure 13:
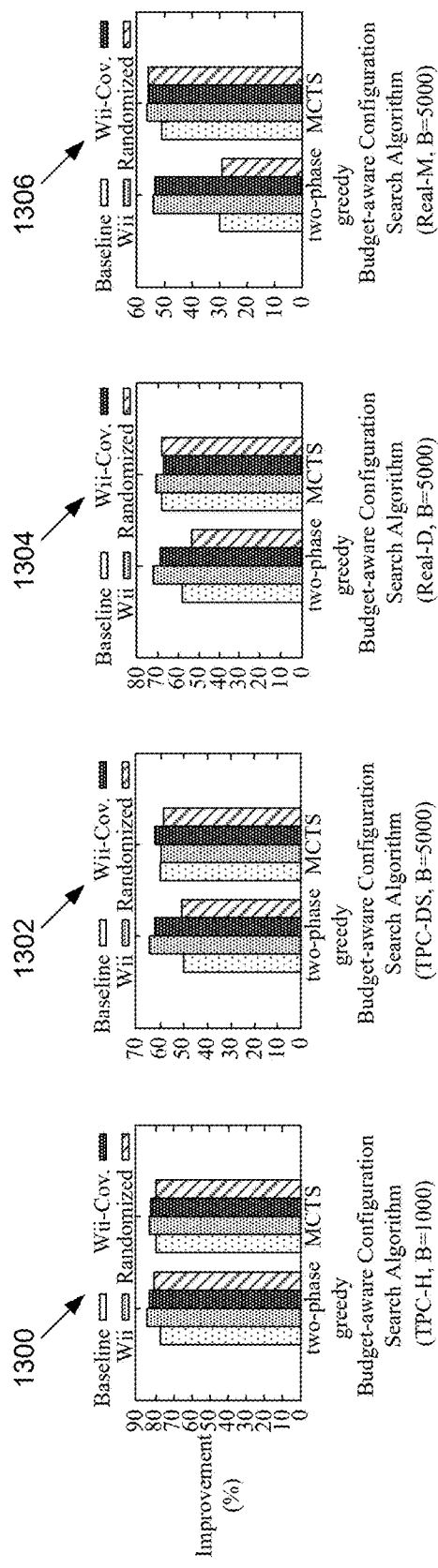
FIG. 13 illustrates graphs that show comparisons of confidence-based skipping versus random skipping.

Evaluating the necessity of a confidence-based skipping mechanism involves considering the additional overhead of computing the lower and upper bounds of what-if costs. To determine whether this complexity is justified, a comparison was made between the confidence-based mechanism and a simple randomized mechanism that skips what-if calls randomly based on a given skipping probability threshold p. FIG. 13 presents the results with $p=\alpha=0.9$, using the same confidence threshold for a fair comparison. The results show that the randomized mechanism performs similarly to the baseline but often much worse than Wii. FIG. 13 includes graphs 1300-1306.

The best possible improvement is challenging to determine without making a what-if call for every QCP enumerated during configuration search, which is impractical. An approximate assessment was provided by using a much larger budget B in two-phase greedy. Specifically, B=5,000 was used for TPC-H and B=20,000 for the other workloads. For each workload, both two-phase greedy without and with Wii were run, and the best improvement observed in these runs was recorded. The 'Best' line in FIGS. 8 and 9 presents this result.

Figure 14:
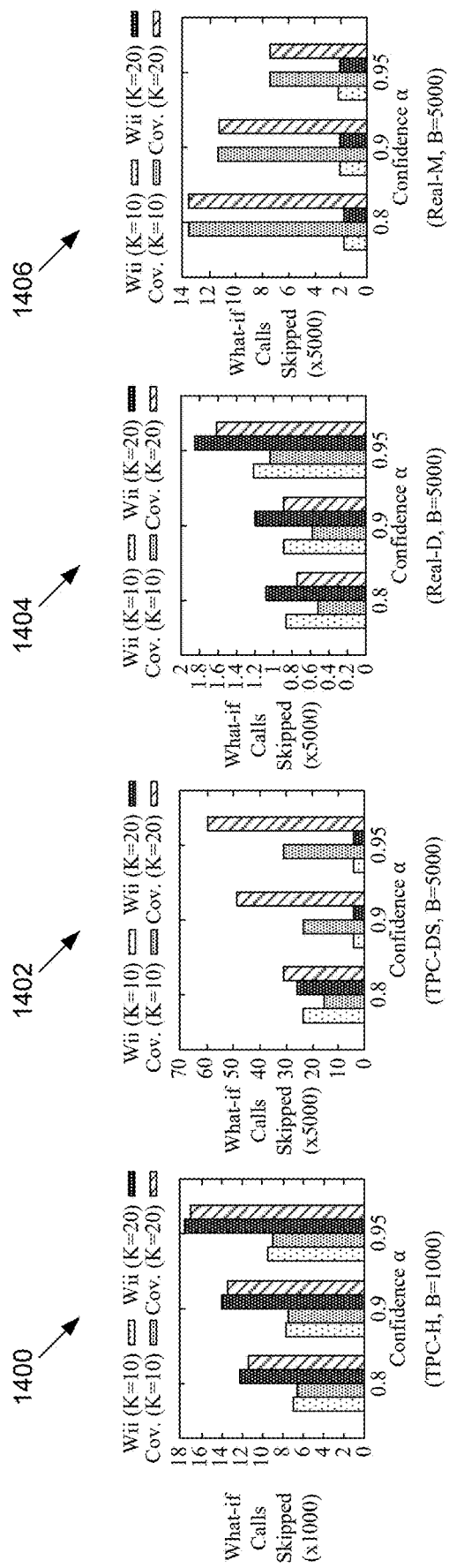
FIG. 14 illustrates graphs that show an amount of what-if calls skipped by two-phase greedy.
Figure 15:
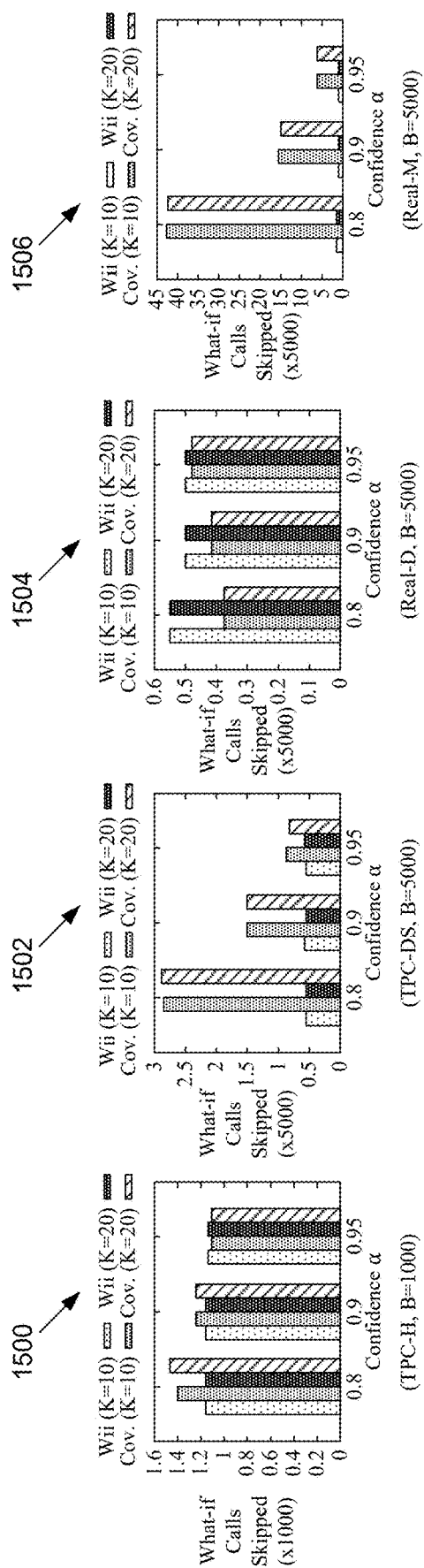
FIG. 15 illustrates graphs that show an amount of what-if calls skipped by MCTS.

Measuring the relative number of what-if calls skipped by Wii involves calculating the ratio between the number of what-if calls skipped and the budget allowed. FIGS. 14 and 15 presents the results for two-phase greedy and MCTS when varying $\alpha \in \{0.8, 0.9, 0.95\}$. FIG. 14 includes graphs 1400-1406. FIG. 15 includes graphs 1500-1506.

Several observations were made. First, in general, Wii is more effective at skipping spurious what-if calls for two-phase greedy than for MCTS. For example, when setting K=20 and $\alpha=0.9$, Wii can skip 3.6B (i.e., 3.6×5,000=18,000) what-if calls for two-phase greedy, whereas only 0.57B (i.e., 2,850) what-if calls for MCTS. This correlates with the observation that Wii exhibits more significant end-to-end improvement in terms of the final index configuration found for two-phase greedy than for MCTS, as highlighted supra.

Second, the coverage-based refinement often enables Wii to skip more what-if calls. For instance, for MCTS on Real-M when setting K=20 and $\alpha=0.8$, Wii is able to skip only 1.48B (i.e., 7,400) what-if calls, which leads to no observable end-to-end improvement over the baseline. With the coverage-based refinement enabled, however, the number of what-if calls that Wii can skip rises to 42.7B (i.e., 213,500), resulting in nearly a 10% boost in end-to-end improvement.

Third, while it might be expected that the number of what-if calls skipped decreases when the confidence threshold a is increased, this is sometimes not the case, especially for two-phase greedy. As shown in FIG. 14, the number of skipped calls can increase when raising a. This unexpected phenomenon is due to the special structure of the two-phase greedy algorithm: lowering a allows more what-if calls to be skipped in the first phase, where the goal is to find good candidate indexes for each individual query. Skipping more what-if calls in the first phase can result in fewer candidate indexes being selected because, without what-if calls, the derived costs for the candidate indexes will have the same value (as the what-if cost with the existing index configuration, i.e., c (q,∅)) and thus exit early in the algorithm. As a result, this eventually leads to a smaller search space for the second phase and therefore fewer opportunities for what-if call interception.

Figure 16:
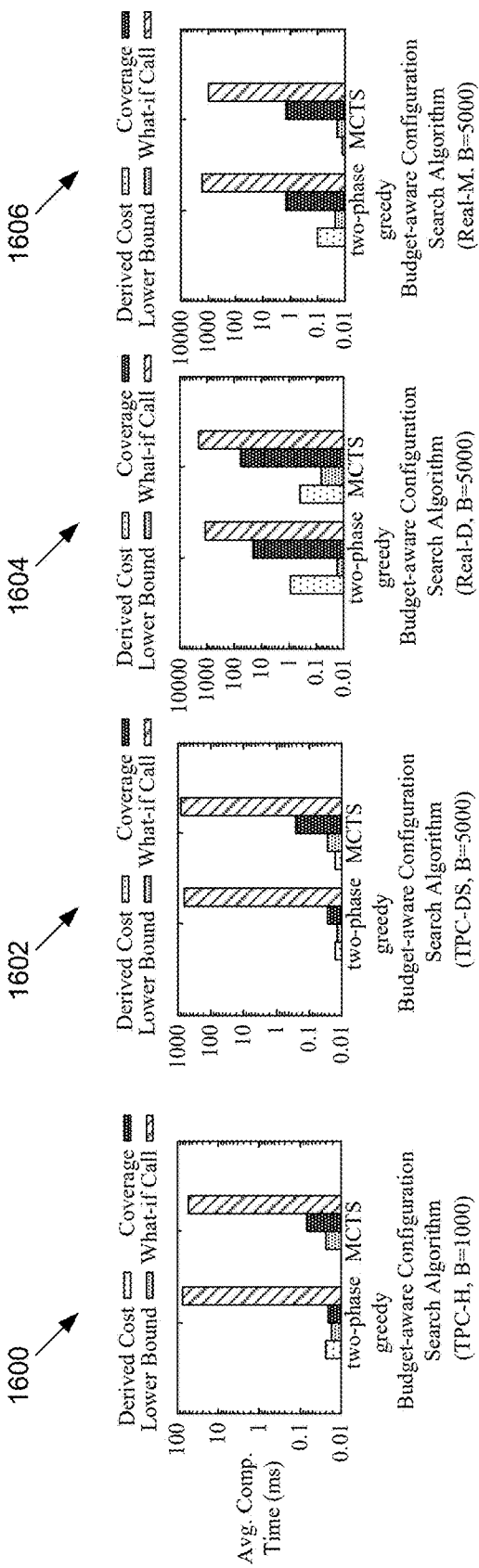
FIG. 16 illustrates graphs that show average computation time of lower bound on what-if calls.

Measuring the average computation time of the lower bound of the what-if cost, the average time of cost derivation is shown as well as making a what-if call for comparison. FIG. 16 summarizes the results when running two-phase greedy and MCTS with K=20 and $\alpha=0.9$. FIG. 16 includes graphs 1600-1606.

Several observations were made. First, the computation time of the lower bound is like cost derivation, both of which are orders of magnitude less than the time required for making a what-if call—the y-axis of FIG. 16 is in logarithmic scale. Second, the coverage-based refinement increases the computation time of the lower bound, but it remains negligible compared to a what-if call.

Table 2 further presents the additional overhead of Wii compared to the baseline configuration search algorithm without Wii, measured as a percentage of the baseline execution time. It is observed that Wii's additional overhead, with or without the coverage-based refinement, is around 3% at maximum, while the typical additional overhead is less than 0.5%.

TABLE 2

| Baseline | Wii (time %) | Wii-Coverage (time %) |
|---|---|---|
| TPC-H (K = 20, α = 0.9, and B = 1,000) | | |
| Two-phase greedy | 0.199% | 0.273% |
| MCTS | 0.064% | 0.106% |
| TPC-DS (K = 20, α = 0.9, and B = 5,000) | | |
| Two-phase greedy | 0.016% | 0.345% |
| MCTS | 0.015% | 0.164% |
| Real-D (K = 20, α = 0.9, and B = 5,000) | | |
| Two-phase greedy | 0.087% | 2.354% |
| MCTS | 0.029% | 3.165% |
| Real-M (K = 20, α = 0.9, and B = 5,000) | | |
| Two-phase greedy | 0.055% | 2.861% |
| MCTS | 0.003% | 2.544% |

Figure 17:
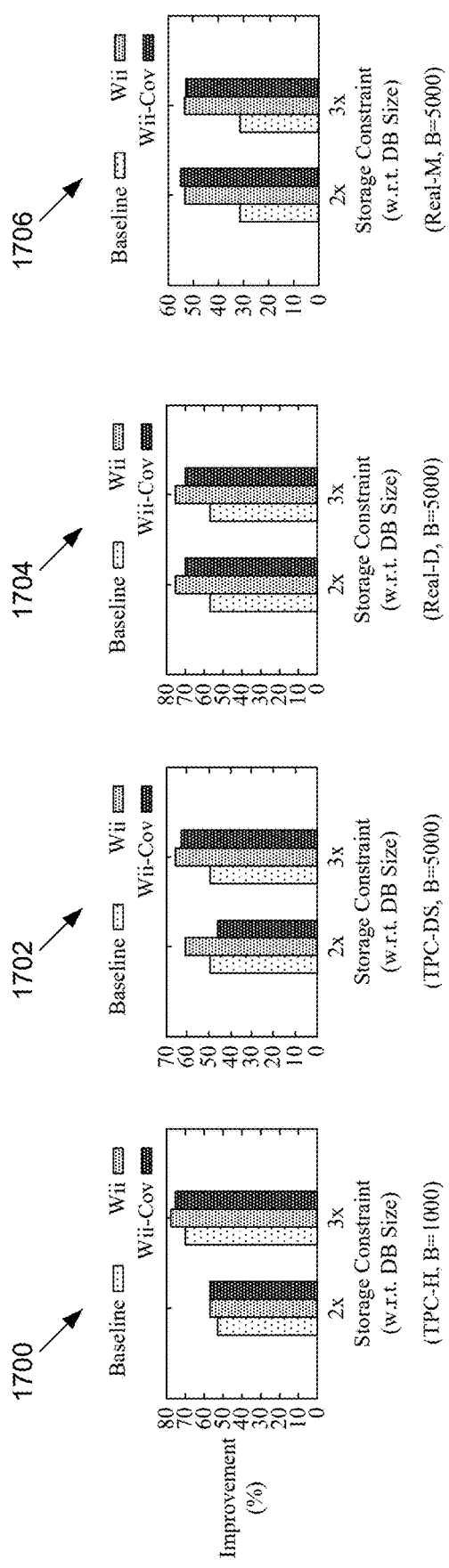
FIG. 17 illustrates graphs that show results for two-phase greedy with varying storage constraints.
Figure 18:
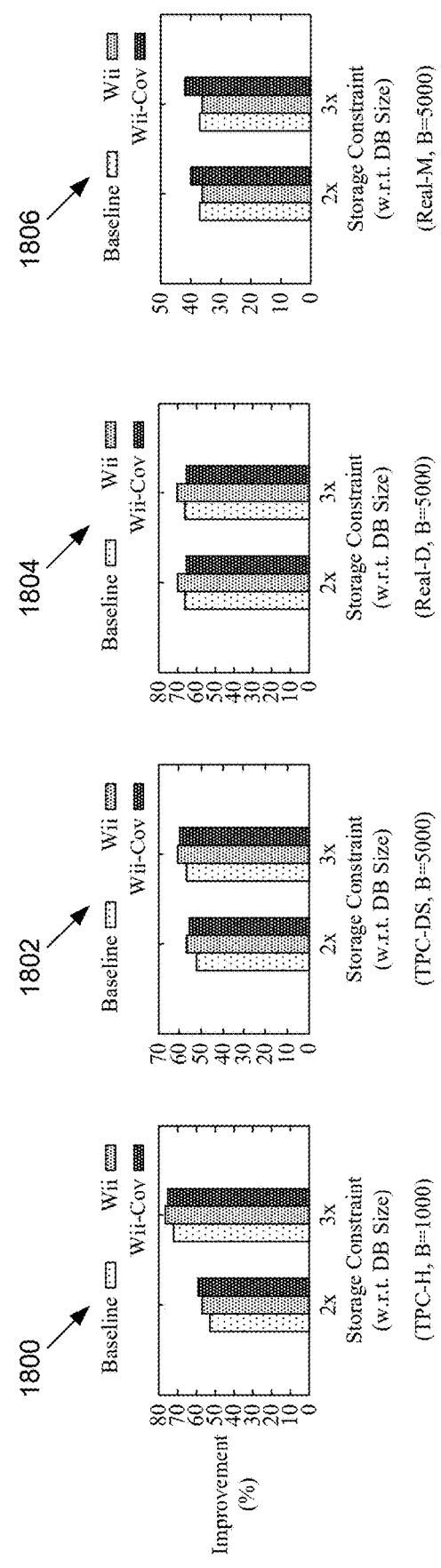
FIG. 18 illustrates graphs that show results for MCTS with varying storage constraints.

As mentioned earlier, practical index tuning may involve additional constraints beyond the cardinality constraint. One common constraint is the storage constraint (SC), which limits the maximum amount of storage taken by the recommended indexes. To demonstrate the robustness of Wii with respect to other constraints, index tuning efficacy was evaluated by varying the SC as well. In the evaluation, K=20, α=0.9, and B=1,000 were fixed for TPC-H, and B=5,000 for the other workloads, while varying the allowed storage size to 2× and 3× of the database (3× is the default setting of DTA). FIGS. 17 and 18 present the evaluation results for two-phase greedy and MOTS. Overall, similar patterns were observed in the presence of SC. Wii, with or without the coverage-based refinement, often significantly outperforms the baseline approaches, especially for two-phase greedy. FIG. 17 includes graphs 1700-1706 and FIG. 18 includes graphs 1800-1806.

Although validation results show that submodularity holds a probability between 0.75 and 0.89 on the tested workloads. As mentioned above, submodularity often fails due to index interaction. For example, the query optimizer may choose an index-intersection plan with two indexes available simultaneously but utilize neither if only one is present. In this case, submodularity does not hold because the marginal contribution index (MCI) of either index will increase after the other index is selected. Consequently, Equation 8 is no longer an MCI upper-bound—it will be smaller than the actual MCI upper-bound. As a result, the L(q,C) computed by Equation 4 will be larger than the actual lower bound of the what-if cost, leading to an overconfident situation for Wii where the confidence is computed by Equation 10. The degree of overconfidence depends on the magnitude of the submodularity violation, which was further measured in the evaluation.

Table 3 summarizes the key statistics of the magnitude of violation measured. Among the four workloads, Real-D and Real-M exhibit relatively higher magnitudes of violation, implying that Wii tends to be more overconfident on these workloads. As a result, Wii is more likely to skip what-if calls that should not have been skipped, especially when the confidence threshold α is relatively low. Correspondingly, more sensitive behavior of Wii is observed on Real-D and Real-M when increasing α from 0.5 to 0.9 (ref. FIG. 8).

TABLE 3

| Workload | Average | Median | 95$^{th}$ Percentile |
|---|---|---|---|
| TPC-H | 0.209 | 0.001 | 1.498 |
| TPC-DS | 2.203 | 0.001 | 10.532 |
| Real-D | 7.658 | 0.010 | 38.197 |
| Real-M | 4.125 | 0.001 | 31.358 |

As noted in the introduction, Wii can also be utilized in situations where there is no budget constraint on the index tuner, allowing an unlimited number of what-if calls. This scenario is particularly relevant for relatively small workloads. While Wii cannot improve the quality of the final configuration found, Wii can significantly reduce the overall index tuning time by skipping unnecessary what-if calls.

Wii plays a different role in this context. Without a budget constraint, Wii cannot enhance the quality of the final configuration since the best quality can eventually be achieved by continuing to issue what-if calls. Instead, Wii improves the efficiency of index tuning by substantially reducing the tuning time.

To demonstrate this, two relatively small workloads, namely TPC-H with 22 queries and Real-D with 32 queries, were tuned using two-phase greedy without enforcing a budget constraint on the number of what-if calls. MCTS was not used as it explicitly leverages the budget constraint by design and cannot operate without budget information. The experiments were conducted with K=20 for TPC-H and K=5 for Real-D to keep the total execution time manageable. The confidence threshold α for Wii was varied within {0.8,0.9}. Table 4 summarizes the evaluation results.

Significant reductions in index tuning time were observed with the use of Wii. For instance, on TPC-H, with the confidence threshold set to α=0.9, the final configurations returned by two-phase greedy, with or without Wii, achieved the same 85.2% improvement over the existing configuration. However, the tuning time was reduced from 8.2 minutes to 1.9 minutes (a 4.3× speedup) when Wii was used. Similarly, on Real-D, with α=0.9, the final configurations returned, with or without Wii, achieved similar improvements over the existing configuration (64% vs. 62.3%). However, the tuning time was reduced from 380.6 minutes to 120 minutes (a 3.2× speedup) with the use of Wii. The index tuning time on Real-D is considerably longer than on TPC-H due to the greater complexity of the Real-D queries.

TABLE 4

| Method | Time (a = 0.8) | Impr. (a = 0.8) | Time (a = 0.9) | Impr. (a = 0.9) |
|---|---|---|---|---|
| TPC-H, K = 20 | | | | |
| Baseline | 8.22 min | 85.22% | 8.22 min | 85.22% |
| Wii | 1.62 min | 84.74% | 1.95 min | 85.26% |
| Wii-Cov | 0.94 min | 83.95% | 1.67 min | 85.02% |
| Real-D, K = 5 | | | | |
| Baseline | 380.63 min | 62.32% | 380.63 min | 62.32% |
| Wii | 118.95 min | 64.10% | 119.99 min | 64.10% |
| Wii-Cov | 31.42 min | 62.90% | 53.38 min | 59.63% |

Budget-aware configuration enumeration is a core problem in index tuning. The problem is NP-hard and difficult to approximate. Although two-phase greedy is currently state-of-the-art, it remains inefficient for large or complex workloads due to the extensive number of what-if calls made to the query optimizer during configuration enumeration. Motivated by this, research has studied a constrained configuration enumeration problem called budget-aware configuration enumeration, which limits the number of what-if calls allowed. This introduces a new budget allocation problem, determining which query-configuration pairs (QCPs) deserve what-if calls. There is a natural exploration/exploitation trade-off in budget allocation.

There has been significant recent work on applying data-driven machine learning (ML) technologies to various aspects of index tuning. These efforts include reducing the chance of performance regression on recommended indexes, developing configuration search algorithms based on deep learning and reinforcement learning, and using learned cost models to replace what-if calls.

From an API point of view, Wii returns an approximation (i.e., derived cost) of the what-if cost whenever a what-if call is saved. Various other technologies on cost approximation and modeling focus on replacing the query optimizer's cost estimate with actual predictions of query execution time.

Wii plays the same role as cost derivation by providing the index tuner with approximated what-if costs whenever possible. Unlike cost derivation, Wii imposes more safeguards on the approximated costs—it only delegates to cost derivation when it determines that the derived costs will be close to the actual what-if costs. However, this comes with an overhead—Wii is computationally more expensive than cost derivation as it requires computing an upper bound of the what-if cost as well. In this regard, Wii can be considered a compromise between using cost derivation and the true what-if cost, balancing computation overhead and cost approximation accuracy.

Additional Examples

Various examples are described above. Additional examples are described below. One example includes a device-implemented method comprising receiving a budget constraint for index tuning within a database system, generating a set of candidate indexes for a workload of queries, determining a derived cost for individual query-configuration pairs (QCP), identifying a subset of QCPs where the derived cost and a what-if cost have a delta value that is below a difference threshold, allocating the budget constraint to the identified QCPs by avoiding what-if calls to the subset of QCPs, reallocating a saved portion of the budget constraint to other QCPs where the delta value is above the difference threshold, evaluating the other QCPs using the what-if calls to select an index configuration, and applying the index configuration to the database system.

Another example can include any of the above and/or below examples where the method further comprises generating an upper bound for the what-if cost for individual QCPs, the upper bound is generated based on cost function properties used by a query optimizer.

Another example can include any of the above and/or below examples where the derived cost is determined using a monotonicity assumption.

Another example can include any of the above and/or below examples where the method further comprises generating a lower bound for the what-if cost for individual QCPs, the lower bound is generated based on marginal cost improvements of individual indexes.

Another example can include any of the above and/or below examples where the method further comprises generating a lower bound for the what-if cost using marginal cost improvement (MCI) values to enhance accuracy of cost estimations and a submodularity assumption.

Another example can include any of the above and/or below examples where the method further comprises using coverage-based refinement to determine necessity of what-if calls, wherein the coverage-based refinement evaluates a presence of singleton-configuration what-if costs and adjusts the lower bound to improve accuracy.

Another example can include any of the above and/or below examples where coverage-based refinement comprises determining a fraction of singleton-configuration what-if costs during index tuning and enabling the coverage-based refinement when the fraction exceeds a predefined threshold.

Another example includes a device-implemented method comprising receiving a budget constraint for index tuning within a database system, enumerating a plurality of query-configuration pairs (QCPs) for evaluation, calculating a derived cost for each QCP using a cost derivation technique, identifying QCPs where the derived cost falls within a predefined percentage threshold of a what-if cost, allocating the budget constraint to avoid what-if calls to the identified QCPs, reallocating a saved portion of the budget constraint to other QCPs where the derived cost does not fall within the predefined percentage threshold of the what-if cost, evaluating the other QCPs using what-if calls to a query optimizer, selecting an index configuration based on the evaluations, and applying the selected index configuration to the database system.

Another example can include any of the above and/or below examples where the method further comprises generating an upper bound for the what-if cost for each QCP.

Another example can include any of the above and/or below examples where the upper bound is the derived cost.

Another example can include any of the above and/or below examples where the method further comprises performing a configuration enumeration that includes a two-phase greedy algorithm, in a first phase, selecting a set of candidate indexes by evaluating a performance improvement each candidate index provides to individual queries within the QCPs and in a second phase, refining the set of candidate indexes by evaluating combinations of the candidate indexes to identify an optimal configuration that maximizes query performance within the budget constraint.

Another example can include any of the above and/or below examples where the method further comprises performing a configuration enumeration involves a Monte Carlo Tree Search (MCTS) algorithm, the method further comprising using the MCTS algorithm to systematically explore a search space of index configurations and identifying possible index configurations in view of the budget constraint for what-if calls.

Another example can include any of the above and/or below examples where calculating the derived cost for each query-configuration pair (QCP) further comprises generating a lower bound for the what-if cost using marginal cost improvement (MCI) values.

Another example can include any of the above and/or below examples where using coverage-based refinement to determine necessity of what-if calls, the coverage-based refinement includes evaluating a presence of singleton-configuration what-if costs and adjusts the lower bound to improve accuracy and determining a fraction of singleton-configuration what-if costs during index tuning and enabling the coverage-based refinement when the fraction exceeds a predefined threshold.

Another example includes a system comprising a processor and a memory storing instructions, the processor executing the instructions to receive a budget constraint for index tuning within a database system, generate a set of candidate indexes for a workload of queries, determine a derived cost for each query-configuration pair (QCP) using a cost derivation technique, identify a subset of QCPs where the derived cost and a what-if cost have a delta value that is below a difference threshold, allocate the budget constraint to the identified QCPs, avoiding what-if calls to the subset of QCPs, reallocate a saved portion of the budget constraint to other QCPs where the delta value is above the difference threshold, evaluate the other QCPs using the what-if calls to select an index configuration, and apply the index configuration to the database system.

Another example can include any of the above and/or below examples where the processor is further configured to generate a lower bound for the what-if cost for each QCP.

Another example can include any of the above and/or below examples where the processor is further configured to generate a lower bound for the what-if cost using marginal cost improvement (MCI) values to enhance accuracy of cost estimations.

Another example can include any of the above and/or below examples where the processor is further configured to generate a confidence measure for each derived cost, the confidence measure being used to determine whether to avoid a what-if call.

Another example can include any of the above and/or below examples where the processor is further configured to use coverage-based refinement to determine a necessity of what-if calls, wherein the coverage-based refinement evaluates a presence of singleton-configuration what-if costs and adjusts the lower bound to improve accuracy.

Another example can include any of the above and/or below examples where coverage-based refinement comprises determining a fraction of singleton-configuration what-if costs during index tuning and enabling the coverage-based refinement when the fraction exceeds a predefined threshold.

CONCLUSION

The description includes novel query optimizers. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device-implemented method, comprising:
receiving a budget constraint for index tuning within a database system;
generating a set of candidate indexes for a workload of queries;
determining a derived cost for individual query-configuration pairs (QCP);
identifying a subset of QCPs where the derived cost and a what-if cost have a delta value that is below a difference threshold;
allocating the budget constraint to the identified QCPs by avoiding what-if calls to the subset of QCPs;
reallocating a saved portion of the budget constraint to other QCPs where the delta value is above the difference threshold;
evaluating the other QCPs using the what-if calls to select an index configuration; and
applying the index configuration to the database system.

2. The method of claim 1, further comprising generating an upper bound for the what-if cost for individual QCPs, the upper bound is generated based on cost function properties used by a query optimizer.

3. The method of claim 1, wherein the derived cost is determined using a monotonicity assumption.

4. The method of claim 1, further comprising generating a lower bound for the what-if cost for individual QCPs, the lower bound is generated based on marginal cost improvements of individual indexes.

5. The method of claim 1, further comprising generating a lower bound for the what-if cost using marginal cost improvement (MCI) values to enhance accuracy of cost estimations and a submodularity assumption.

6. The method of claim 1, further comprising using coverage-based refinement to determine necessity of what-if calls, wherein the coverage-based refinement evaluates a presence of singleton-configuration what-if costs and adjusts the lower bound to improve accuracy.

7. The method of claim 6, wherein coverage-based refinement comprises determining a fraction of singleton-configuration what-if costs during index tuning and enabling the coverage-based refinement when the fraction exceeds a predefined threshold.

8. A device-implemented method, comprising:
receiving a budget constraint for index tuning within a database system;
enumerating a plurality of query-configuration pairs (QCPs) for evaluation;
calculating a derived cost for each QCP using a cost derivation technique;
identifying QCPs where the derived cost falls within a predefined percentage threshold of a what-if cost;
allocating the budget constraint to avoid what-if calls to the identified QCPs;
reallocating a saved portion of the budget constraint to other QCPs where the derived cost does not fall within the predefined percentage threshold of the what-if cost;
evaluating the other QCPs using what-if calls to a query optimizer;
selecting an index configuration based on the evaluations; and
applying the selected index configuration to the database system.

9. The method of claim 8, further comprising generating an upper bound for the what-if cost for each QCP.

10. The method of claim 9, wherein the upper bound is the derived cost.

11. The method of claim 8, further comprising performing a configuration enumeration that includes a two-phase greedy algorithm:
in a first phase, selecting a set of candidate indexes by evaluating a performance improvement each candidate index provides to individual queries within the QCPs; and
in a second phase, refining the set of candidate indexes by evaluating combinations of the candidate indexes to identify an optimal configuration that maximizes query performance within the budget constraint.

12. The method of claim 8, further comprising performing a configuration enumeration involves a Monte Carlo Tree Search (MCTS) algorithm, the method further comprising:
using the MCTS algorithm to systematically explore a search space of index configurations; and
identifying possible index configurations in view of the budget constraint for what-if calls.

13. The method of claim 8, wherein calculating the derived cost for each query-configuration pair (QCP) further comprises generating a lower bound for the what-if cost using marginal cost improvement (MCI) values.

14. The method of claim 8, further comprising using coverage-based refinement to determine necessity of what-if calls, the coverage-based refinement includes:
    evaluating a presence of singleton-configuration what-if costs and adjusts the lower bound to improve accuracy; and
    determining a fraction of singleton-configuration what-if costs during index tuning and enabling the coverage-based refinement when the fraction exceeds a predefined threshold.

15. A system, comprising:
    a processor; and
    a memory storing instructions, the processor executing the instructions to:
    receive a budget constraint for index tuning within a database system;
    generate a set of candidate indexes for a workload of queries;
    determine a derived cost for each query-configuration pair (QCP) using a cost derivation technique;
    identify a subset of QCPs where the derived cost and a what-if cost have a delta value that is below a difference threshold;
    allocate the budget constraint to the identified QCPs, avoiding what-if calls to the subset of QCPs;
    reallocate a saved portion of the budget constraint to other QCPs where the delta value is above the difference threshold;
    evaluate the other QCPs using the what-if calls to select an index configuration; and
    apply the index configuration to the database system.

16. The system of claim 15, wherein the processor is further configured to generate a lower bound for the what-if cost for each QCP.

17. The system of claim 15, wherein the processor is further configured to generate a lower bound for the what-if cost using marginal cost improvement (MCI) values to enhance accuracy of cost estimations.

18. The system of claim 15, wherein the processor is further configured to generate a confidence measure for each derived cost, the confidence measure being used to determine whether to avoid a what-if call.

19. The system of claim 15, wherein the processor is further configured to use coverage-based refinement to determine a necessity of what-if calls, wherein the coverage-based refinement evaluates a presence of singleton-configuration what-if costs and adjusts the lower bound to improve accuracy.

20. The system of claim 19, wherein coverage-based refinement comprises determining a fraction of singleton-configuration what-if costs during index tuning and enabling the coverage-based refinement when the fraction exceeds a predefined threshold.

* * * * *